United States Patent
Matsui et al.

(10) Patent No.: US 8,558,939 B2
(45) Date of Patent: Oct. 15, 2013

(54) IMAGE PICKUP LENS AND IMAGE PICKUP APPARATUS

(75) Inventors: Kazuki Matsui, Hachioji (JP); Yasunari Fukuta, Osaka (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 0 days.

(21) Appl. No.: 13/501,678

(22) PCT Filed: Oct. 6, 2010

(86) PCT No.: PCT/JP2010/067533
§ 371 (c)(1),
(2), (4) Date: Apr. 12, 2012

(87) PCT Pub. No.: WO2011/046053
PCT Pub. Date: Apr. 21, 2011

(65) Prior Publication Data
US 2012/0206639 A1    Aug. 16, 2012

(30) Foreign Application Priority Data
Oct. 16, 2009    (JP) .................................. 2009-239640

(51) Int. Cl.
*H04N 5/225* (2006.01)
(52) U.S. Cl.
USPC ............ 348/340; 248/791; 248/716; 348/360
(58) Field of Classification Search
USPC .......... 348/340, 335; 359/716, 784, 791, 754, 359/797
See application file for complete search history.

(56) References Cited

U.S. PATENT DOCUMENTS

| 7,830,622 | B2 * | 11/2010 | Shinohara | 359/784 |
| 2008/0170302 | A1 * | 7/2008 | Jeong | 359/716 |
| 2008/0291551 | A1 * | 11/2008 | Sato et al. | 359/716 |
| 2010/0328518 | A1 * | 12/2010 | Iba et al. | 348/340 |

FOREIGN PATENT DOCUMENTS

| JP | 2005-0017884 | 11/2005 |
| JP | 2005-308800 | 11/2005 |
| JP | 2007-156277 | 6/2007 |
| JP | 2008-65305 | 3/2008 |
| JP | 2008-70425 | 3/2008 |
| JP | 2009-92803 | 4/2009 |

* cited by examiner

*Primary Examiner* — Tuan Ho
*Assistant Examiner* — Zhenzhen Wu
(74) *Attorney, Agent, or Firm* — Cozen O'Connor

(57) ABSTRACT

Provided is an image pickup lens composed of three lens elements and an image pickup apparatus using the same, where the image pickup lens has satisfactorily corrected aberrations despite being smaller in size than conventional image pickup lenses. As image pickup lens includes, in order from the object side, an aperture stop, a first lens, a second lens, and a third lens. The first lens is a positive lens and is a meniscus lens having a convex surface facing the object side and a concave surface facing the object side, and the third lens is a negative lens. The image pickup lens satisfies conditional expressions relating to an air gap between the second and third lenses, a focal length of the second lens, and a curvature radius of the object-side surface of the second lens.

8 Claims, 16 Drawing Sheets

F=2.84

— d-LINE
---- g-LINE

-0.2 -0.1 0 0.1 0.2
SPHERICAL
ABERRATION (mm)

Y=2.24mm

— S
---- M

-0.2 -0.1 0 0.1 0.2
ASTIGMATISM (mm)

Y=2.24mm

-5.0 -2.5 0 2.5 5.0
DISTORTION (%)

F=2.85 d-LINE
--- g-LINE

-0.2 -0.1 0 0.1 0.2
SPHERICAL
ABERRATION (mm)

Y=2.24mm

—— S
---- M

-0.2 -0.1 0 0.1 0.2
ASTIGMATISM (mm)

Y=2.24mm

-5.0 -2.5 0 2.5 5.0
DISTORTION (%)

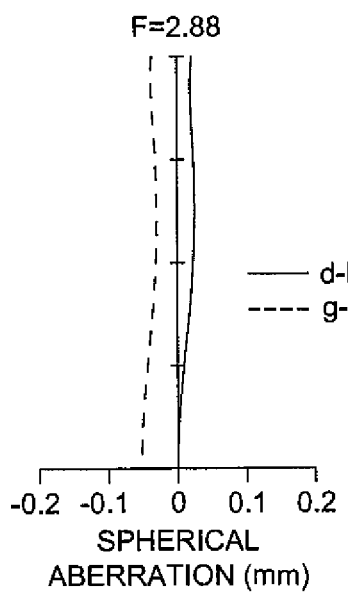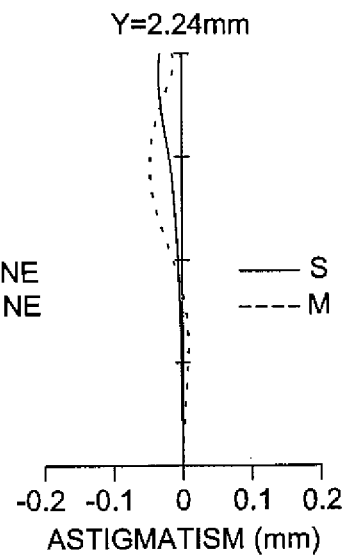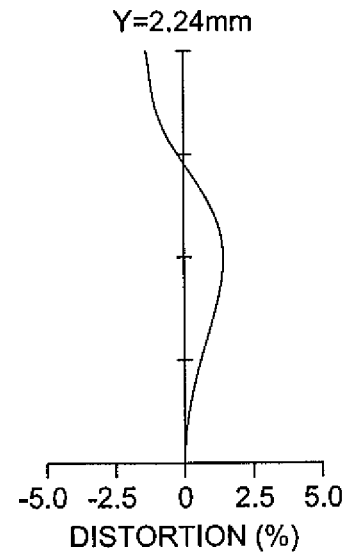
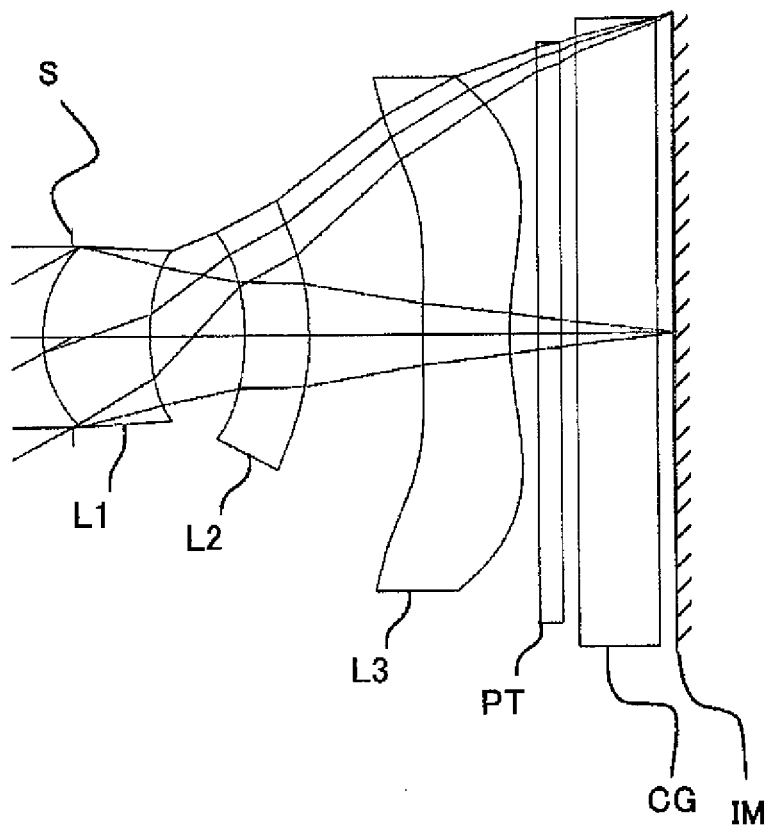

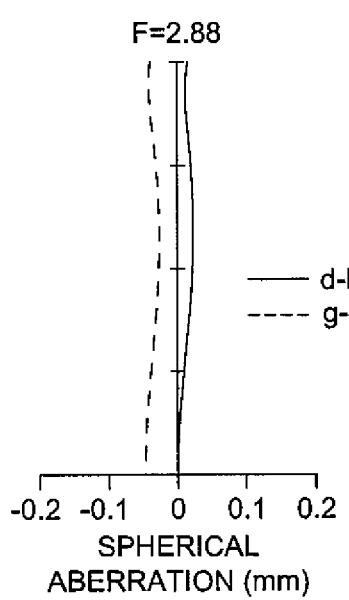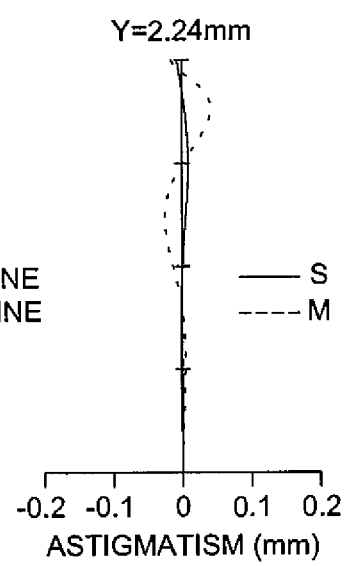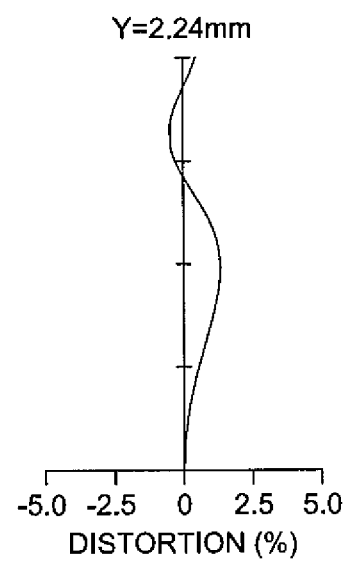

F=2.88 d-LINE
---- g-LINE

SPHERICAL
ABERRATION (mm)

Y=2.24mm

——— S
---- M

ASTIGMATISM (mm)

Y=2.24mm

DISTORTION (%)

F=2.83

— d-LINE
---- g-LINE

-0.2 -0.1 0 0.1 0.2
SPHERICAL
ABERRATION (mm)

Y=2.24mm

— S
---- M

-0.2 -0.1 0 0.1 0.2
ASTIGMATISM (mm)

Y=2.24mm

-5.0 -2.5 0 2.5 5.0
DISTORTION (%)

IMAGE PICKUP LENS AND IMAGE PICKUP APPARATUS

RELATED APPLICATIONS

This is a U.S. National Phase Application under 35 USC 371 of International Application PCT/JP2010/067533 filed on Oct. 6, 2010.

This application claims the priority of JP 2009-239640 filed on Oct. 6, 2009, the entire content of which is hereby incorporated by reference.

TECHNICAL FIELD

The present invention relates to an image pickup lens suitable for an image pickup apparatus employing a solid-state image pickup element such as a CCD (Charge Coupled Devices) type image sensor and a CMOS (Complementary Metal-Oxide Semiconductor) type image sensor, and to an image pickup apparatus.

BACKGROUND ART

Recently, compact and thin image pickup apparatuses each employing a solid-state image pickup element such as a CCD type image sensor and a CMOS type image sensor have come to be mounted on mobile terminals being compact and thin electronic devices such as a cell phone and PDA (Personal Digital Assistant), and further on note PCs, which allows mutual transmission not only of sound information but also of image information to a remote location. Such the image pickup apparatuses are strongly demanded to be downsized and to handle high quality images realizing image quality expected by users.

A solid-state image pickup element and an image pickup lens are main components constructing an image pickup apparatus. As a solid-state image pickup element, many apparatuses use a device such as a CCD type image sensor and a CMOS type image sensor, In recent years, downsizing of pixel pitch of a solid-state image pickup element has been advanced, and high resolution and high performance are being achieved by using the increased number of pixels. On the other hand, downsizing of a solid-state image pickup element is being achieved by keeping the number of pixels.

In view of those, an image pickup lens which has a three-lens structure and includes a first lens and second lens both having positive power, has been proposed as disclosed in Patent Literature 1. Further, an image pickup lens wherein a second lens is negative has been proposed as shown in Patent literatures 2 to 4.

CITATION LIST

Patent Literature
  Patent Literature 1: JP-A No. 2005-17884
  Patent Literature 2: JP-A No. 2007-156277
  Patent Literature 3: JP-B No. 4256442
  Patent Literature 4: JP-A No. 2005-308800

SUMMARY OF INVENTION

Technical Problem

However, in the image pickup lens disclosed in Patent Literature 1, correction of coma and astigmatism is not sufficient, and it is hardly considered that the image pickup lens is configured to handle an increased number of pixels of a solid-state image pickup element Further, it was difficult for image pickup lenses disclosed in Patent Literatures 2 to 4 to form high quality images, because of their insufficient F-numbers, insufficiently corrected astigmatism, and large curvature of field.

The present invention has been achieved in view of such the problems and is aimed to provide an image pickup lens which has a three-lens structure, and an image pickup apparatus using the image pickup lens. In the image pickup lens, various aberrations are corrected satisfactorily, while a smaller size than the conventional image pickup lenses is achieved.

As for a dimension of a small-sized image pickup lens, the present invention is aimed to achieve downsizing at the level satisfying the following expression (I).

$$TL/2Y'<0.9 \qquad (I)$$

In the expression, TL is a distance on the optical axis from the lens surface arranged at the closest position to the object side in the total system of the image pickup lens to the focal point at the image side, and $2Y'$ is a diagonal length of an image pickup plane of a solid-state image pickup element (a diagonal length of a rectangular effective pixel area of the solid-state image pickup element). Satisfying the range allows to downsize the whole image pickup apparatus and reduce the outer diameter of the lens as a synergy effect. Thereby, the image pickup apparatus can be reduced in size and weight as a whole.

In the above description, "focal point at the image side" means an image point formed when a parallel ray which is parallel with the optical axis enters a lens. When there is an a parallel flat plate such as an optical low-pass filter, an infrared cut-off filter, a band-pass filter and a sealing glass of a solid-state image pickup element package, at a position between the lens surface arranged at the closest position to the image side in the image pickup lens and the focal point at the image side, the value of TL is calculated on the assumption that a space of the parallel flat plate is regarded as an air-equivalent distance.

Solution to Problem

An image pickup lens described as an aspect of the present invention is an image pickup lens characterized by comprising, in order from an object side thereof, an aperture stop, a first lens, a second lens and a third lens, wherein the first lens is a positive lens and is a meniscus lens having a convex surface facing the object side and a concave surface facing an image side, the second lens is a lens including a concave surface facing the object side, the third lens is a negative lens, and the image pickup lens satisfies the following conditional expressions.

$$0.10 < D4/f < 0.25 \qquad (1)$$

$$0.00 \leq |f/f2| < 0.65 \qquad (2)$$

$$-2.50 < f/r3 < 0.00 \qquad (3)$$

In the expressions, D4 is a distance (mm) of an air gap on an optical axis between the second lens and the third lens,
 f is a focal length (mm) of a total system of the image pickup lens,
 f2 is a focal length (mm) of the second lens, and
 r3 is a curvature radius (mm) of the surface facing the object side of the second lens.

A basic construction of the present invention for obtaining a compact image pickup lens with excellently corrected aberrations, is composed of, in order from the object side, an aperture stop, a first lens having a positive refractive power and having a meniscus shape including a convex surface facing the object side and a concave surface facing the image side, a second lens including a concave surface facing the object side, and a third lens having negative refractive power. This lens construction is advantageous in downsizing the total length of the image pickup lens because the first surface is convex toward the object side and the second surface is concave toward the image side in the first lens. Further, the third lens being a negative lens makes the Petzval sum small, and enables to obtain an image pickup lens in which an excellent image-forming property is kept up to the periphery. By arranging an aperture stop at a position closer to the object side than the object-side surface of the first lens, the position of the exit pupil can be located farther than an image pickup plane. Therefore, the total length can be reduced, while telecentric property (hereinafter, is referred as "telecentricity") is kept to be excellent Herein, the relationship of the total length of the image pickup lens and the focal length of the first lens will be described. It is assumed that the lens constriction relating to the present invention is made up of a thin positive lens which is composed of the first lens and the second lens, and a thin negative lens which is composed of the third lens. The total length of the lens is provided by the following expression, where f12 is a focal length of the first compound lens, d is a distance between the two compound lenses, fB is a distance (back focal length) from the second compound lens to the image plane.

$$L = fB + d \qquad (7)$$
$$= f(1 - d/f12) + d$$
$$= f - ((f/f12) - 1)d$$

Assuming that the focal length f of the total system and the composite focal length f12 of the first lens and second lens are constant, the expression (7) shows that the total length can be more reduced as the distanced between the compound lens composed of the first lens and the second lens, and the third lens is greater. On the other hand, assuming that the focal length f of the total system and distanced between the compound lens composed of the first lens and the second lens, and the third lens (namely, D4) are constant, the expression (7) shows that the total length can be more reduced as the composite focal length f12 of the first lens and second lens is smaller.

(Effect of Conditional Expression (1))

Conditional expression (1) is a conditional expression for shortening the total length of the image pickup lens. As described above, in order to shorten the total length of the image pickup lens, distance D4 is preferably set to be broad. However, when the value of D4/f of Conditional expression (1) exceeds the upper limit, a bundle of axial rays entering the third lens becomes excessively thin and longitudinal chromatic aberration is hardly corrected in an excellent condition. Further, the height of off-axis rays entering the third lens becomes high and it makes the diameter of the third lens large, which is disadvantageous in making the lens compact On the other hand, when the value of D4/f of Conditional expression (1) is lower than the lower limit, the total lens length is hardly reduced effectively. Therefore, it is preferable that Conditional expression (1) is satisfied. Further, the range of the following expression (1') is more preferable.

$$0.10 < D4/f < 0.20 \qquad (1')$$

(Effects of Conditional Expression (2))

Conditional expression (2) is a conditional expression for shortening the total length of the image pickup lens. As described above, in order to shorten the total lens length, the composite focal length f12 of the first lens and the second lens is required to be reduced. For reducing the composite focal length f12, it can be considered to strengthen the power of the first lens firstly. However, an increase of the power of the first lens enlarges spherical aberration and coma to be generated at an off-axis area, and they are not corrected sufficiently with the succeeding lens.

When the power of the second lens is negative, the second lens with weaker power makes composite focal length f12 smaller and makes the total length shorter. When the power of the second lens is positive, the second lens with greater power is advantageous in decreasing the total length, but excessively strong power of the second lens makes longitudinal chromatic aberration insufficiently corrected and further makes Petzval sum great so that curvature of field cannot be corrected. From the above viewpoints, it is preferable that the power of the second lens is weaker whether the power is positive or negative, for reducing the total length with correcting the longitudinal aberration and curvature of field. Therefore, it is preferable that Conditional expression (2) is satisfied. Further, the range of the following expression (2') is more preferable.

$$0.00 \le |f/f2| < 0.55 \qquad (2')$$

(Effects of Conditional Expression (3))

Conditional expression (3) is a conditional expression for correcting coma excellently at the intermediate image height with reducing the total length of the image pickup lens. For correcting coma, it is preferable to make curvature of a surface where a thick light flux passes as gentle as possible and to reduce the difference between curvature of the surface at a position around the optical axis of the light flux and curvature of the surface at a position around the periphery of the light flux. Therefore, it is preferable that Conditional expression (3) is satisfied. Further, the range of the following expression (3') is more preferable.

$$-2.35 < f/r3 < 0.00 \qquad (3')$$

In the present specification, it is defined that the curvature radius of a convex surface is positive and the curvature radius of a concave surface is negative.

An image pickup lens as another aspect of the present invention is that the above image pickup lens is characterized in that at least a surface facing the image side of the third lens is an aspheric surface, and the aspheric surface includes at least one aspheric-surface inflection point.

By forming at least the surface facing the image side of the third lens into an aspheric shape including an inflection point, telecentric property of a light flux at the image side can be secured easily. Further, astigmatism and coma which are generated in an off-axis area can be corrected excellently. Herein, "an inflection point" means a point on an aspheric surface such that a tangential plane at a peak of the aspheric surface becomes perpendicular to the optical axis on a curve of the sectional shape of the lens within the effective radius.

An image pickup lens as another aspect of the present invention is that the above image pickup lens is characterized in that the third lens is a negative meniscus lens in which a convex surface faces the object side in a paraxial region thereof.

By forming the third lens into a meniscus shape whose convex surface faces the object side, the position of the principal point of the third lens being a negative lens is located closer to the image side, which enlarges distanced of the compound lens of the first lens and the second lens, and the third lens in the above expression (7), and enables to reduce the total lens length L.

An image pickup lens as another aspect of the present invention is that the above image pickup lens is characterized by satisfying the following expression (4).

$$-1.00 < f3/f < 0.00 \quad (4)$$

In the expression, f3 is a focal length (mm) of the third lens.
(Effects of Conditional Expression (4))

Conditional expression (4) is a conditional expression for correcting various aberrations excellently with reducing the total length of the image pickup lens. The third lens as a negative lens having stronger power can keep longitudinal chromatic aberration and curvature of field smaller. However, the third lens having weaker power can keep telecentricity more excellently. Therefore, it is important to adjust the balance of them. When the value of f3/f becomes lower than the lower limit of Conditional expression (4), it is advantageous in aberration correction but the total length becomes excessively long, which is disadvantageous in downsizing. On the other hand, when the value of f3/f exceeds the upper limit of Conditional expression (4), aberration correction becomes insufficient. Therefore, it is preferable that the conditional expression (4) is satisfied.

An image pickup lens as another aspect of the present invention is that the above image pickup lens is characterized by satisfying the following expression (5).

$$-1.90 < f/r4 < 0.40 \quad (5)$$

In the expression, r4 is a curvature radius (mm) of a surface facing the image side of the second lens.
(Effects of Conditional Expression 5)

Conditional expression (5) is a conditional expression for correcting various aberrations excellently with reducing the total length of the image pickup lens. When the curvature of the object-side surface of the second lens is gentle, a lens in which Petzval sum and chromatic aberrations are corrected can be obtained, while the total length is kept to be small, by setting the value of r4 to satisfy Conditional expression (5). When the value of r4 is positive, the negative power of the second lens becomes greater as the value of r4 becomes smaller, which makes correction of various aberrations easy. However, when the value exceeds the upper limit of Conditional expression (5), the total length becomes excessively large. On the other hand, when the value of r4 is negative, the composite power of the first and second lenses becomes greater in the positive direction and the total length becomes shorter as the value of r4 becomes closer to zero. However, when the value becomes below the lower limit of Conditional expression (5), longitudinal chromatic aberration becomes great and Petzval sum is deteriorated. Therefore, it is preferable that the conditional expression (5) is satisfied.

An image pickup lens as another aspect of the present invention is that the above image pickup lens is characterized in that the second lens satisfies the following expression (6).

$$1.55 < n2 \quad (6)$$

In the expression, n2 is a refractive index of the second lens.
(Effects of Conditional Expression (6))

Conditional expression (6) is a conditional expression for correcting coma excellently with reducing the total length of the image pickup lens. By increasing the refractive index of the second lens so as to satisfy Conditional expression (6), the curvature radius of the object-side surface of the second lens can be furthermore reduced, and coma can be corrected excellently.

An image pickup lens as another aspect of the present invention is that the above image pickup lens is characterized in that each of the first lens, the second lens and the third lens is formed of a heat-resistant material.

By forming each of the first lens, the second lens and the third lens out of a heat-resistant material, they can be used for a so-called reflow processing that electric parts and lens modules are mounted on a substrate at the same time in a high-temperature reflow furnace. Therefore, a large number of image pickup apparatuses can be produced at low cost The heat-resistant material is preferably a heat-resistant glass.

An image pickup apparatus as another aspect of the present invention is characterized by comprising any one of the above image pickup lenses and a solid-state image pickup element.

Advantageous Effects of Invention

According to the present invention, there can be provided a three-element image pickup lens which is smaller than the conventional image pickup lenses and exhibits excellently corrected various aberrations, and an image pickup apparatus equipped with the image pickup lens.

Figure 3A:
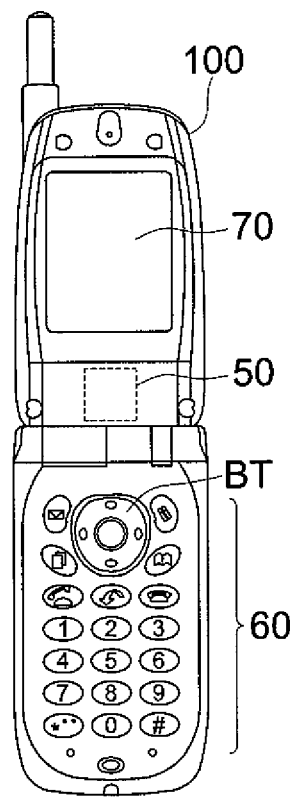
Figure 3B:
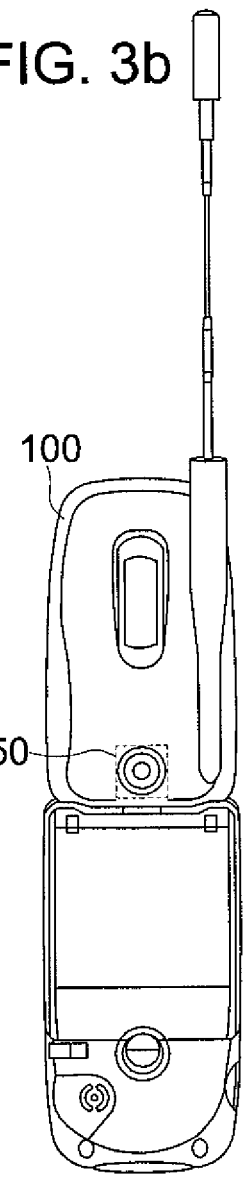

Each of FIGS. 3a and 3b shows a condition that image pickup apparatus 50 is mounted on cell phone 100 as a mobile terminal.

Figure 4:
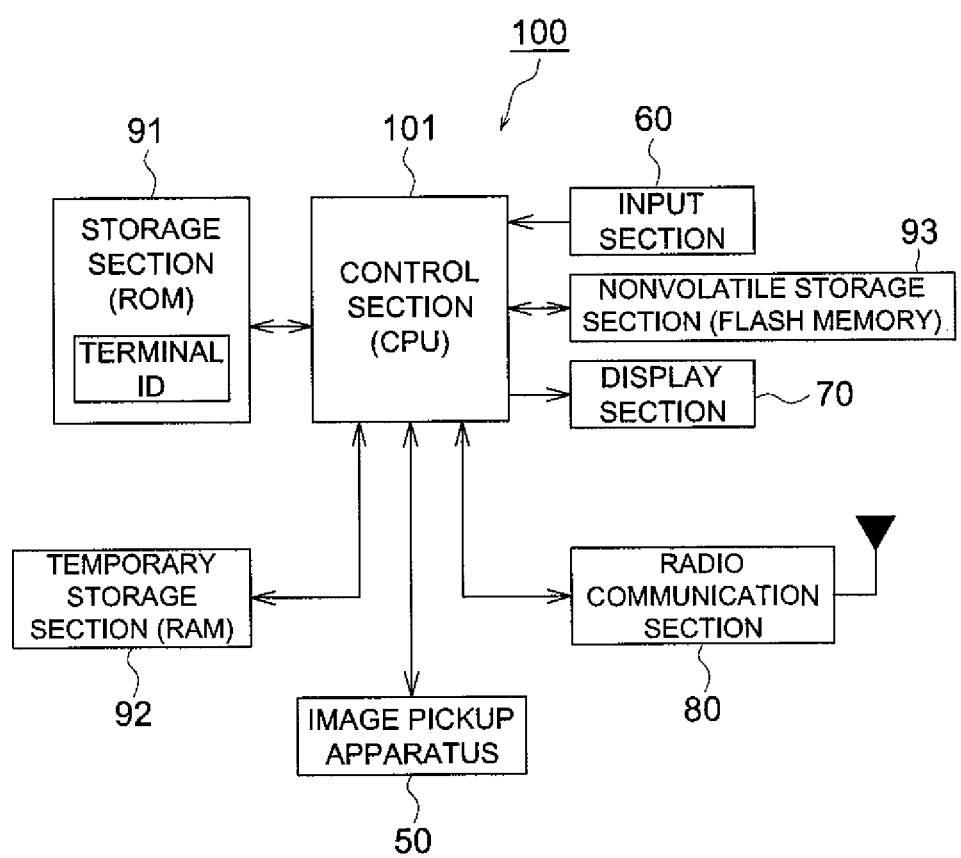

FIG. 4 shows a control block diagram of cell phone 100.

Figure 5:
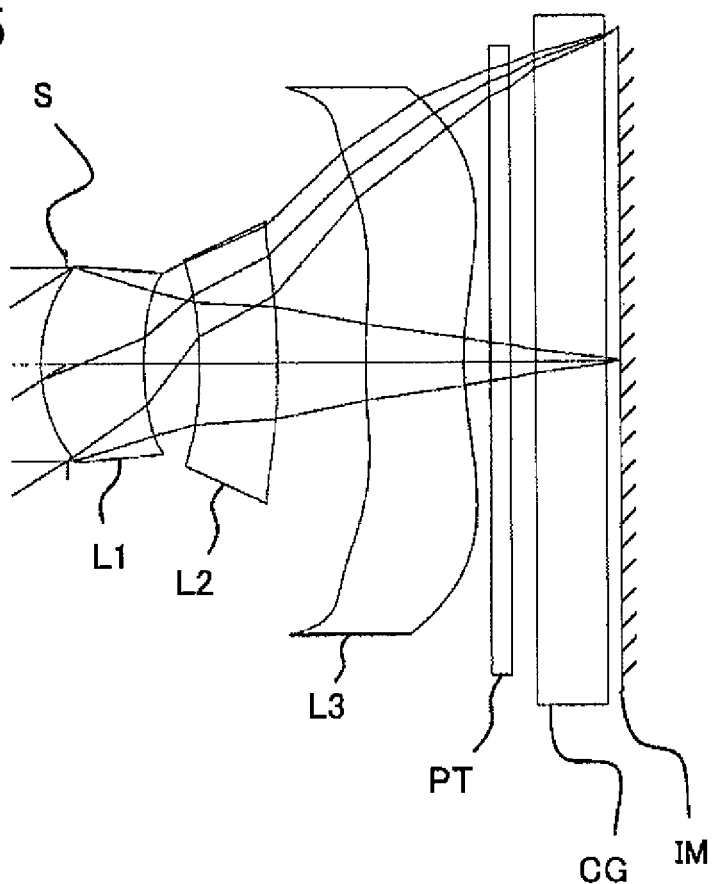

FIG. 5 shows a sectional view of the image pickup lens of Example 1.

Figure 6A:
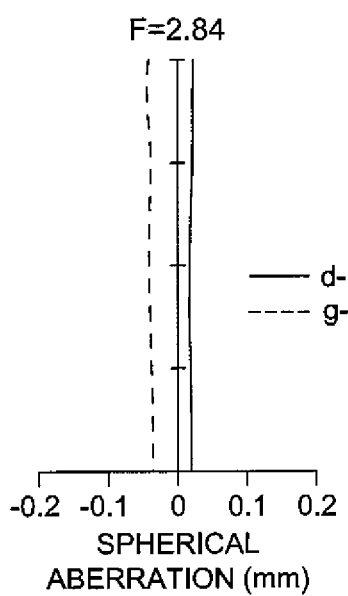
Figure 6B:
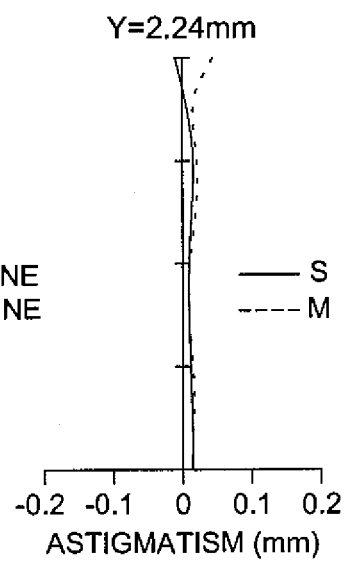
Figure 6C:
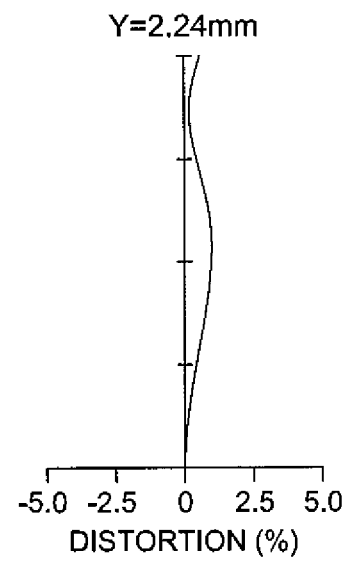

FIGS. 6a, 6b, and 6c show aberration diagrams of spherical aberration, astigmatism, and distortion of the image pickup lens of Example 1.

Figure 7:
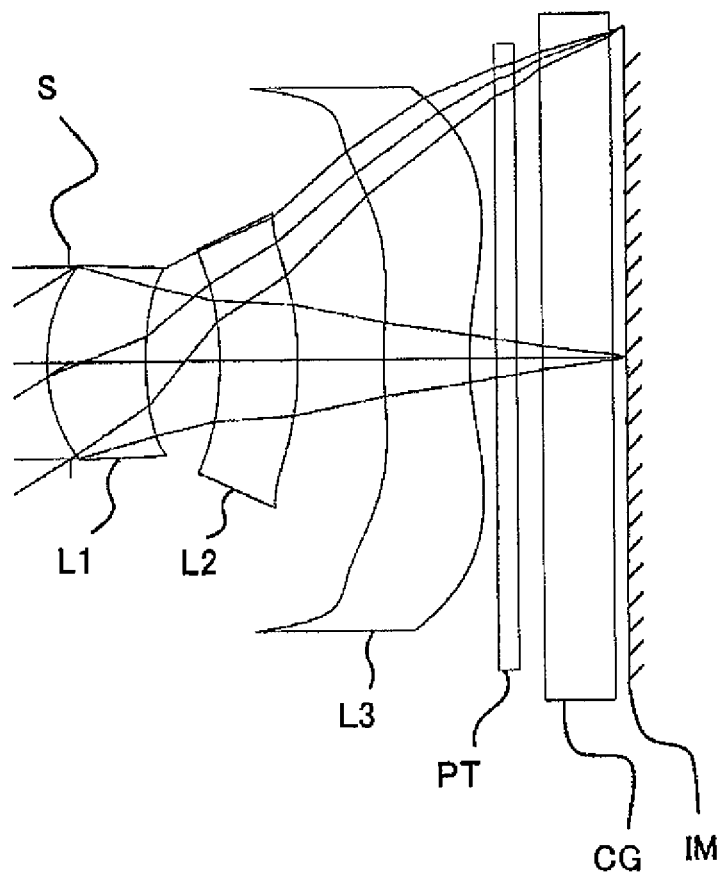

FIG. 7 shows a sectional view of the image pickup lens of Example 2.

Figure 8A:
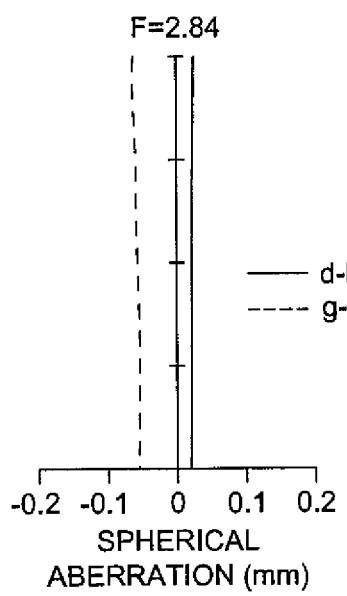
Figure 8B:
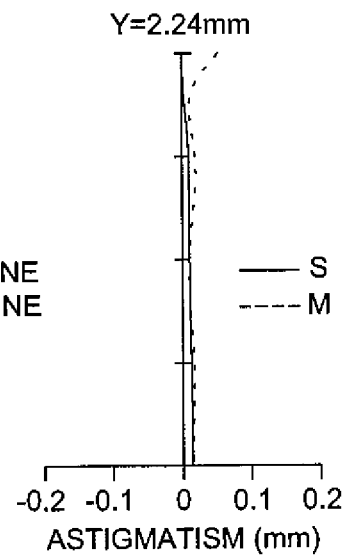
Figure 8C:
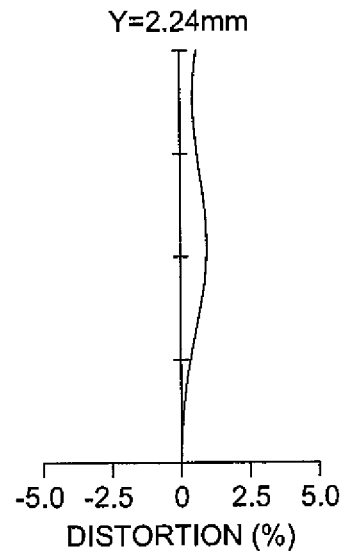

FIGS. 8a, 8b, and 8c show aberration diagrams of spherical aberration, astigmatism, and distortion of the image pickup lens of Example 2.

Figure 9:
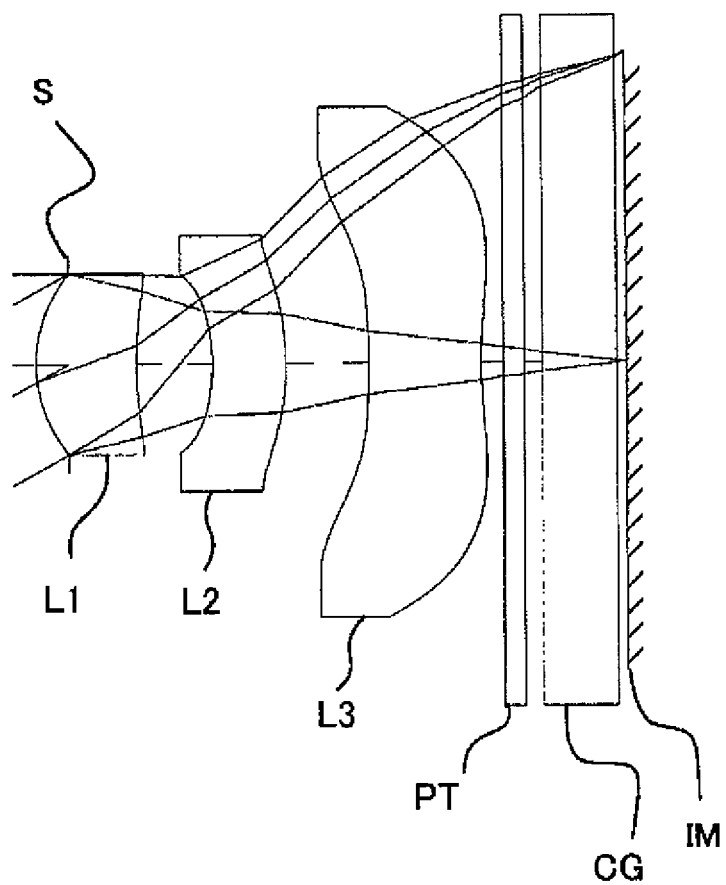

FIG. 9 shows a sectional view of the image pickup lens of Example 3.

Figure 10A:
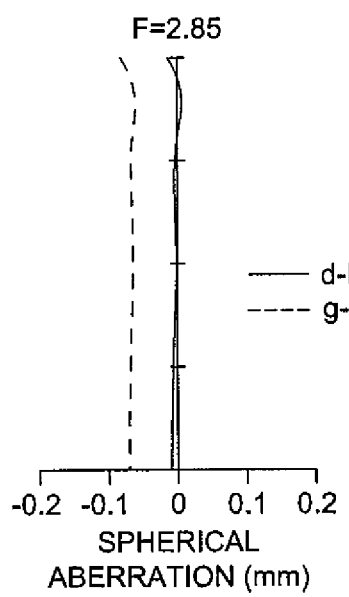
Figure 10B:
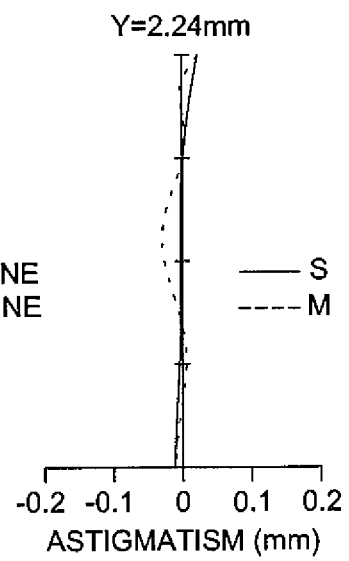
Figure 10C:
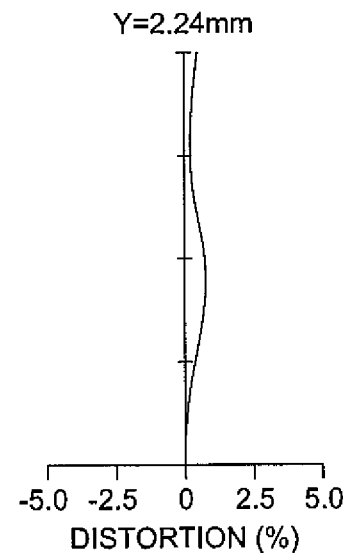

FIGS. 10a, 10b, and 10c show aberration diagrams of spherical aberration, astigmatism, and distortion of the image pickup lens of Example 3.

Figure 11:
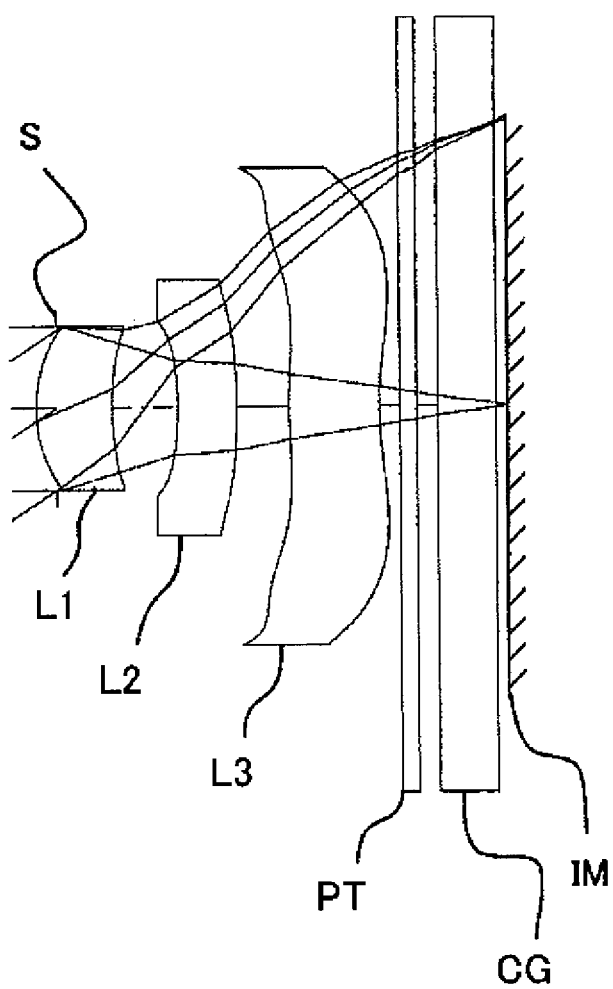

FIG. 11 shows a sectional view of the image pickup lens of Example 4.

Figure 12A:
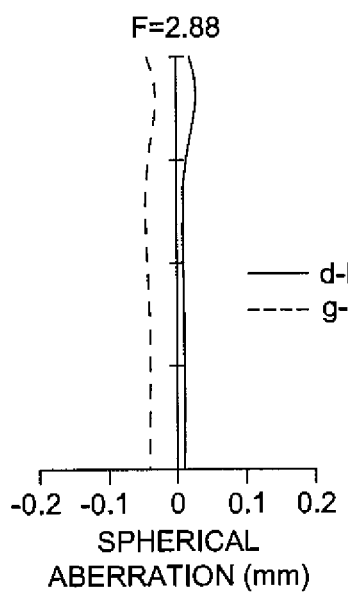
Figure 12B:
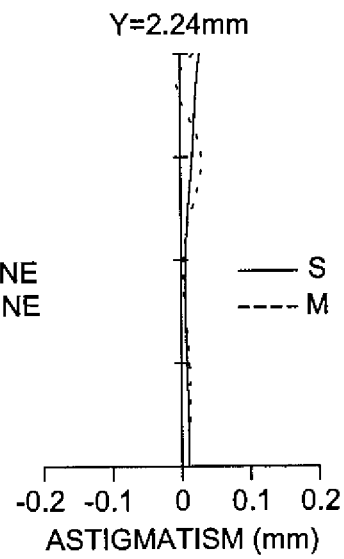
Figure 12C:
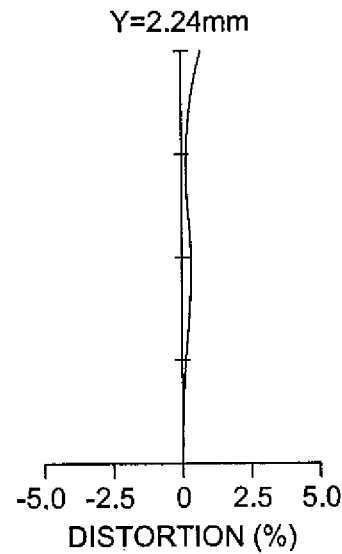

FIGS. 12a, 12b, and 12c show aberration diagrams of spherical aberration, astigmatism, and distortion of the image pickup lens of Example 4.

Figure 13:
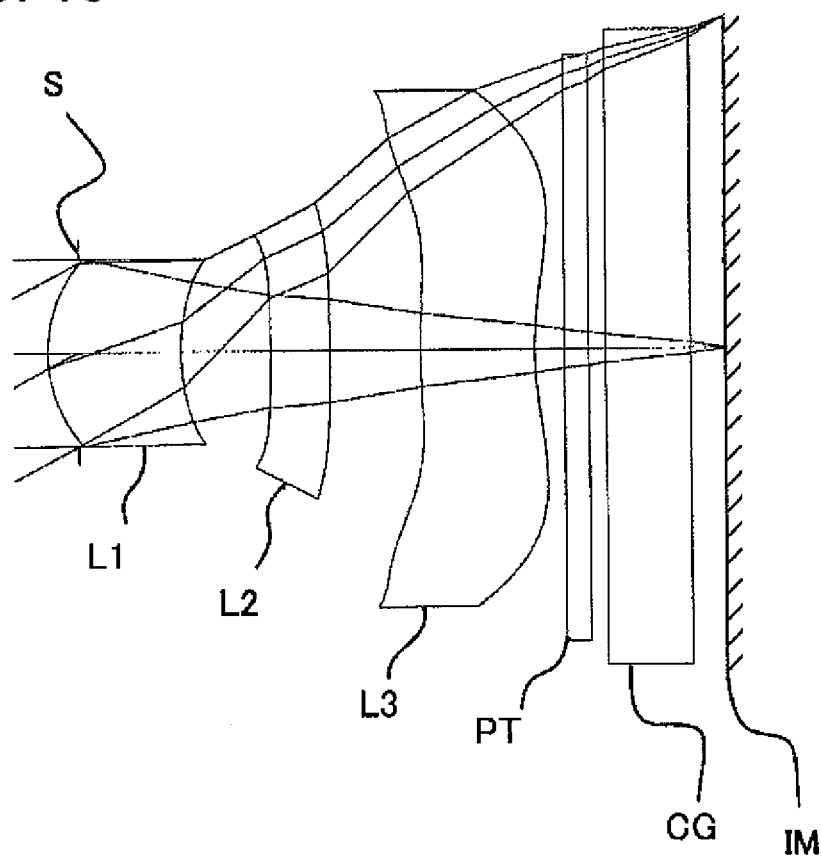

FIG. 13 shows a sectional view of the image pickup lens of Example 5.

FIGS. 14a, 14b, and 14c show aberration diagrams of spherical aberration, astigmatism, and distortion of the image pickup lens of Example 5.

FIG. 15 shows a sectional view of the image pickup lens of Example 6.

Figure 16A:
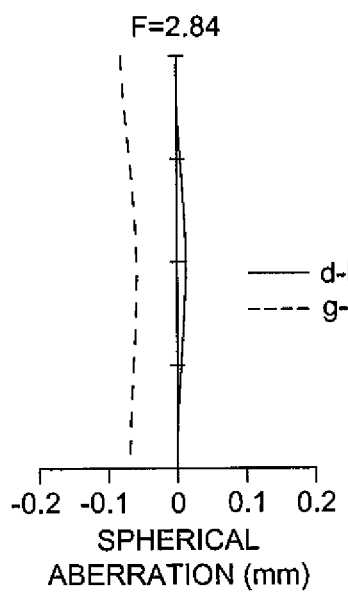
Figure 16B:
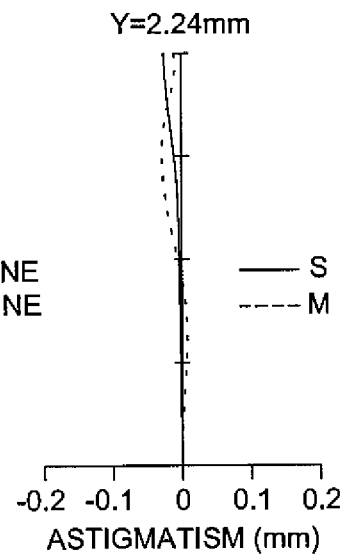
Figure 16C:
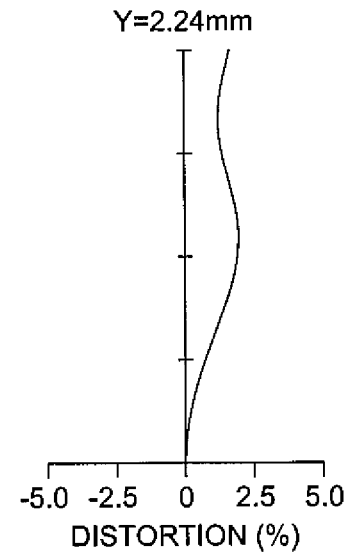

FIGS. 16a, 16b, and 16c show aberration diagrams of spherical aberration, astigmatism, and distortion of the image pickup lens of Example 6.

Figure 17:
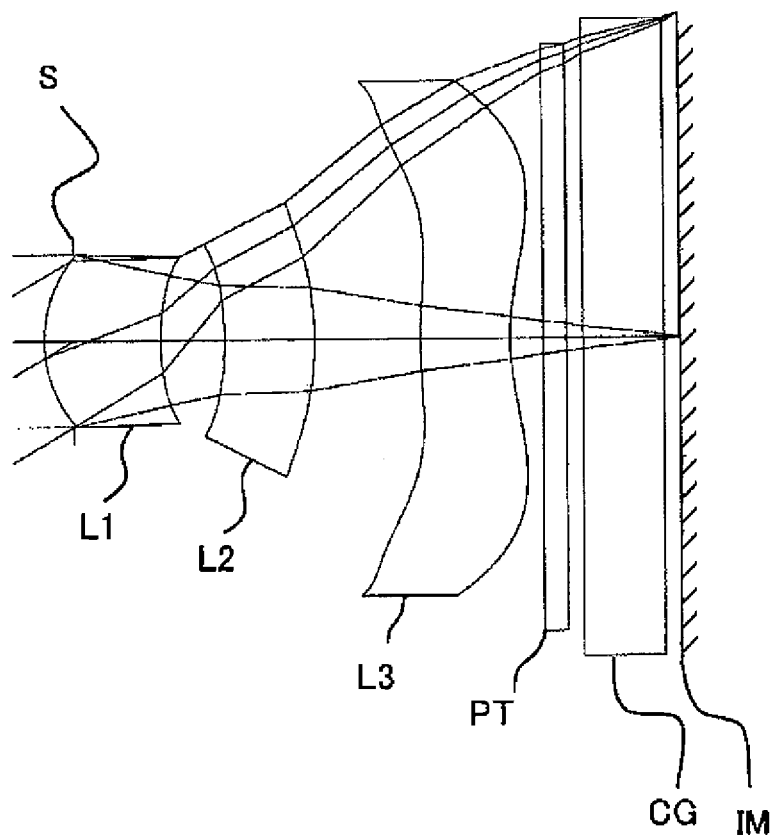

FIG. 17 shows a sectional view of the image pickup lens of Example 7.

Figure 18A:
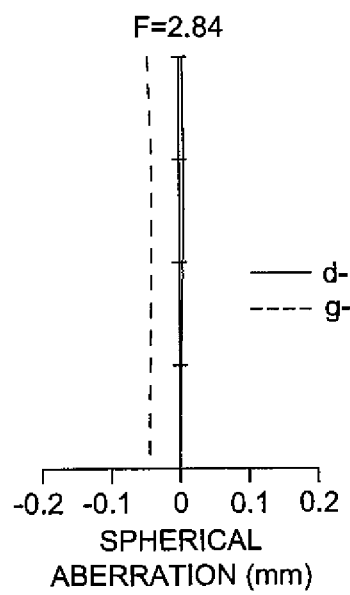
Figure 18B:
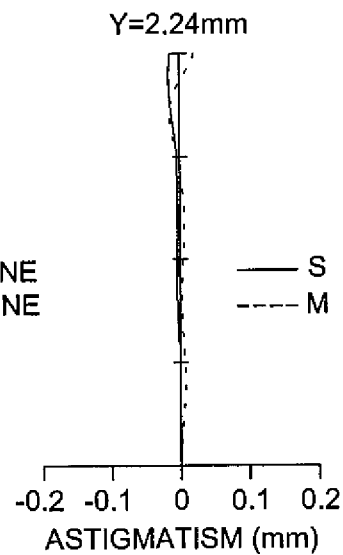
Figure 18C:
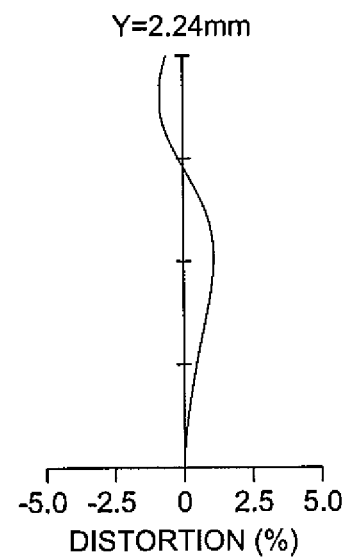

FIGS. 18a, 18b, and 18c show aberration diagrams of spherical aberration, astigmatism, and distortion of the image pickup lens of Example 7.

Figure 19:
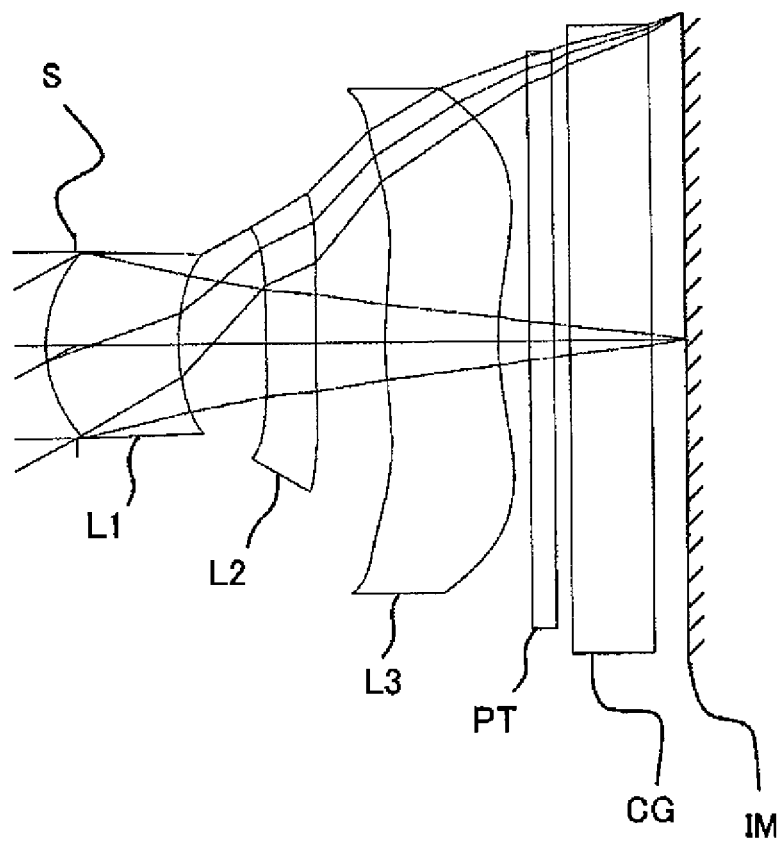

FIG. 19 shows a sectional view of the image pickup lens of Example 8.

FIGS. 20a, 20b, and 20c show aberration diagrams of spherical aberration, astigmatism, and distortion of the image pickup lens of Example 8.

Figure 21:
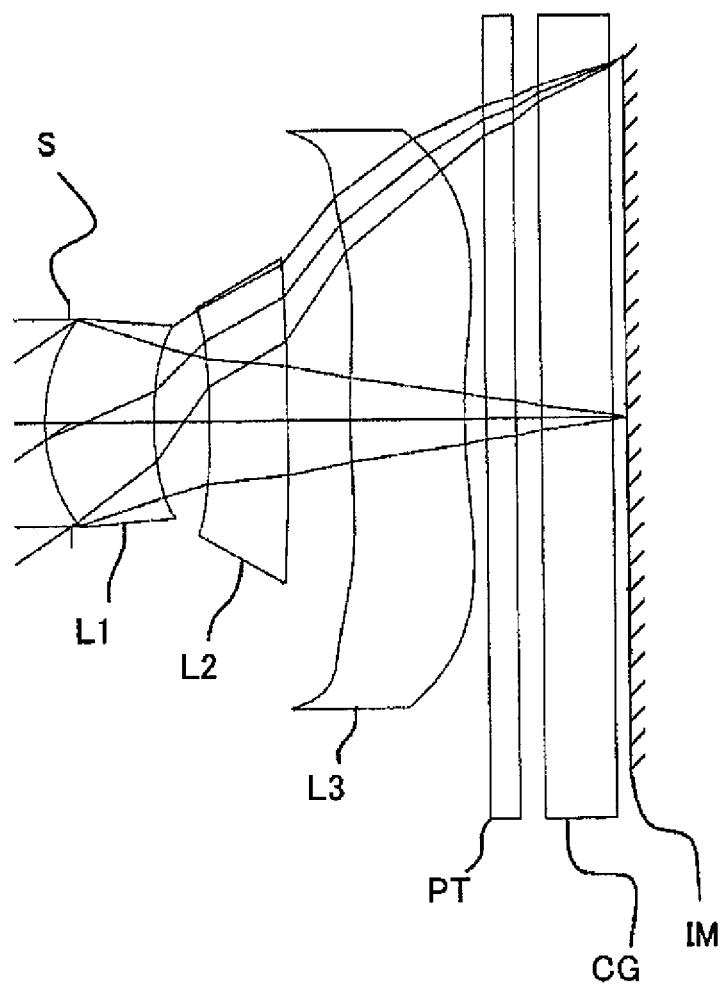

FIG. 21 shows a sectional view of the image pickup lens of Example 9.

Figure 22A:
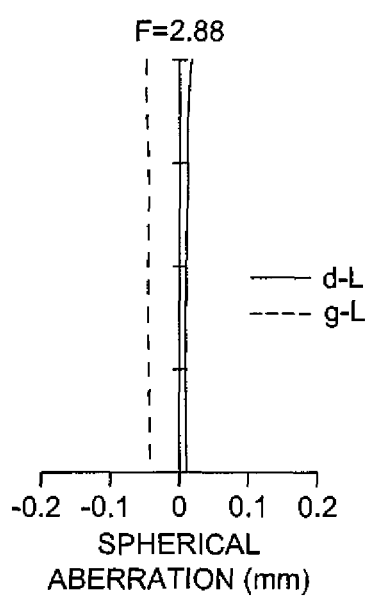
Figure 22B:
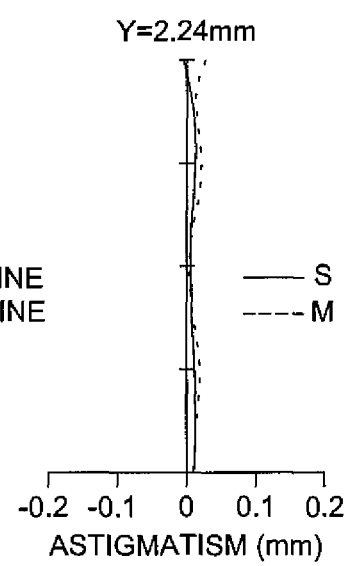
Figure 22C:
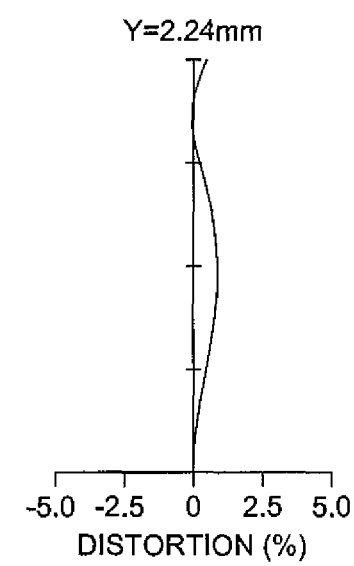

FIGS. 22a, 22b, and 22c show aberration diagrams of spherical aberration, astigmatism, and distortion of the image pickup lens of Example 9.

Figure 23:
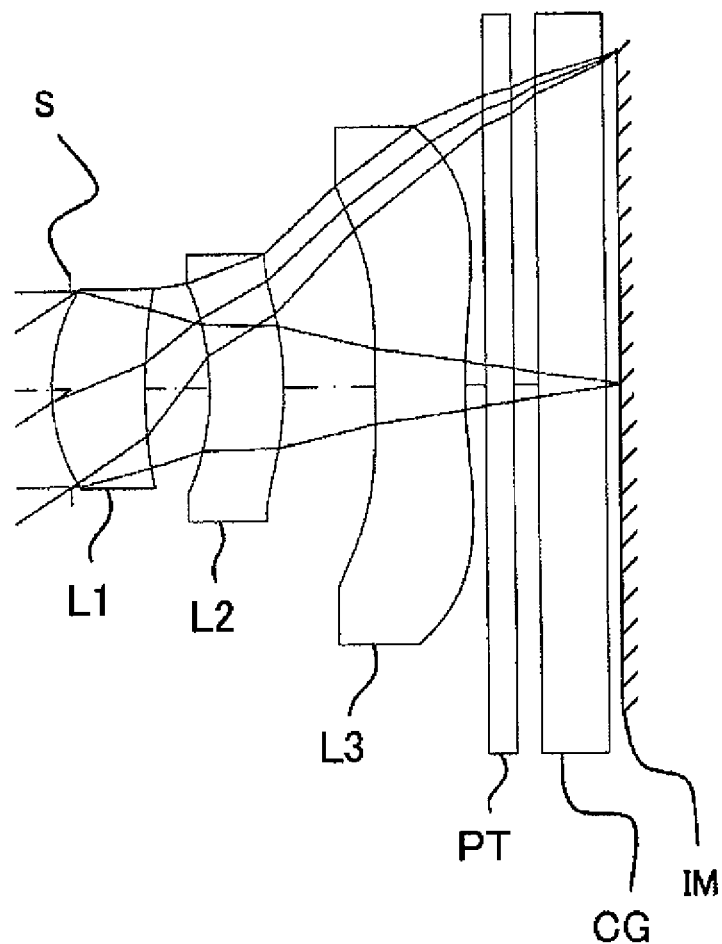

FIG. 23 shows a sectional view of the image pickup lens of Example 10.

Figure 24A:
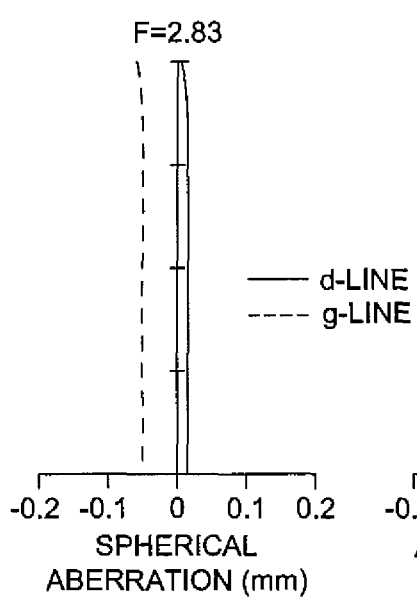
Figure 24B:
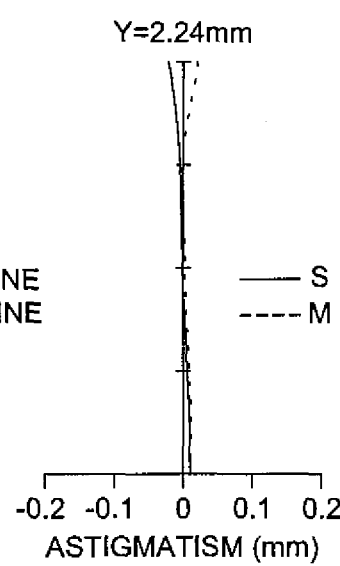
Figure 24C:
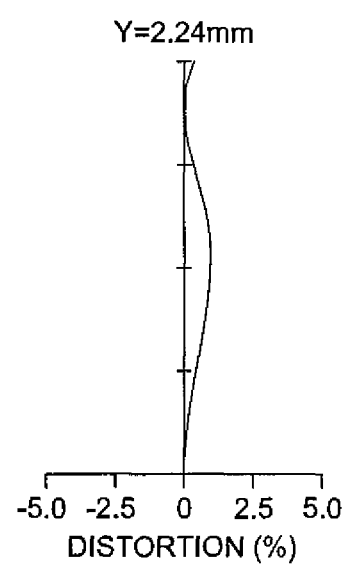

FIGS. 24a, 24b, and 24c show aberration diagrams of spherical aberration, astigmatism, and distortion of the image pickup lens of Example 10.

DESCRIPTION OF EMBODIMENTS

Figure 1:
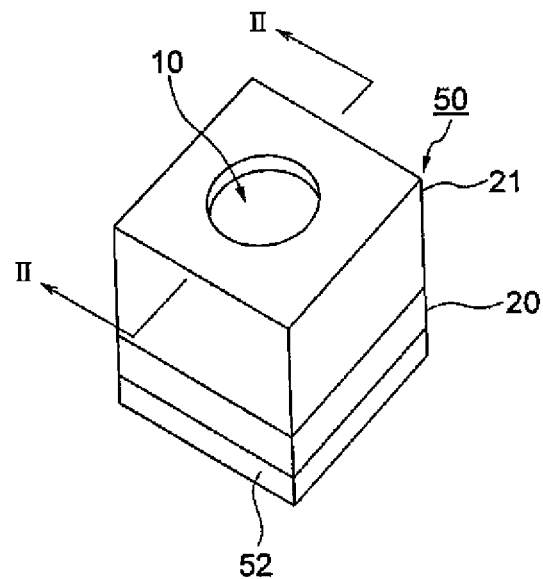
FIG. 1 shows a perspective view illustrating an image pickup apparatus 50 relating to the present embodiment.
Figure 2:
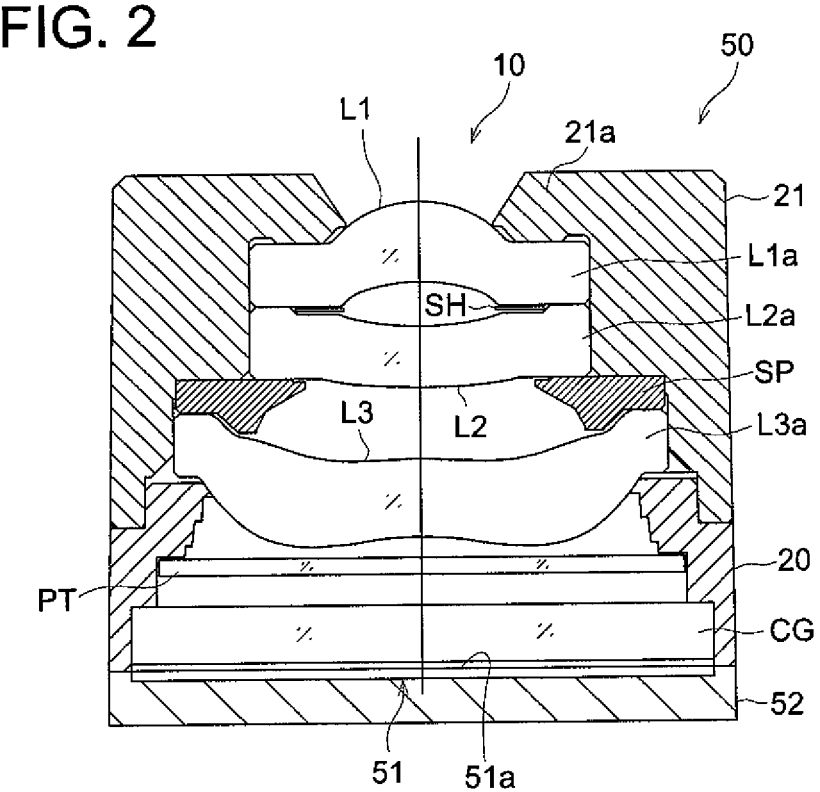
FIG. 2 shows a sectional view illustrating the structure of FIG. 1 which is cut along arrowed lines II-II, and is viewed in the direction of the arrows.

The embodiment of the present invention will be described with referring to the drawings. FIG. 1 is a perspective view of image pickup apparatus 50 relating to the present embodiment. FIG. 2 is a sectional view illustrating the structure of FIG. 1 which is cut along arrowed lines II-II and is viewed in the arrowed direction. As shown in FIG. 2, image pickup apparatus 50 includes CMOS type image sensor 51 as a solid-state image pickup element having photoelectric conversion section 51a; image pickup lens 10 for forming a subject image onto photoelectric conversion section 51a of the image sensor 51; substrate 52 supporting image sensor 51 and including an external connecting terminal (which is unillustrated) for transmitting and receiving electric signal of the image sensor 51. They are integrally formed in one body.

The above image sensor 51 includes photoelectric conversion section 51a representing a light-receiving section, on the central portion of a surface on the light-receiving side of the image sensor 51, and is connected to a signal processing circuit which is not illustrated, wherein on the photoelectric conversion section 51a, pixels (photoelectric conversion elements) are arranged on a two-dimensional basis. The signal processing circuit is composed of a drive circuit section that obtains signal electric charges by driving respective pixels in succession, A/D converting section that converts each signal electric charge into digital signal and of a signal processing section that forms an output of image signal by using the digital signal. Around the outer edge of the light-receiving-side plane of image sensor 51, many pads (which are not illustrated) are provided and connected with substrate 52 through wires which are not illustrated. The image pickup element 51 converts the signal charges from the photoelectric conversion section 51a into image signal such as digital YUV signal, and outputs it to a predetermined circuit on substrate 52 through wires (which are not illustrated). Reference sign Y represents luminance signal, U (=R−Y) represents color difference signal between red and the luminance signal, and V (=B−Y) represents color difference signal between blue and the luminance signal. Hereupon, the solid-state image pickup element is not limited to the above-described CMOS type image sensor, but another element such as a CCD can be employed.

Substrate 52 supporting image sensor 51 is connected to image sensor 51 with wires which are not illustrated so as to enable communication between them.

Substrate 52 is connected with an external circuit (for example, a control circuit provided by the higher level of apparatus of a mobile terminal on which the image pickup apparatus is mounted) through an unillustrated external connecting terminal, which enables to receive voltage and clock signal for driving image sensor 51 from the external circuit and to output the digital YUV signal to the external circuit.

The top of image sensor 51 is covered and sealed with cover glass CG which is attached to lower lens frame 20 in a rectangular tube (or a cylindrical) shape. Further, above cover glass CG, plate PT such as an infrared cut-off filter is fixed to lower lens frame 20. The lower end of lower lens frame 20 holding the edges of glass cover CG and plate PT is fixed to the upper surface of substrate 52 with surrounding image sensor 51. The upper end of lower lens frame 20 is connected with the lower and of upper lens frame 21 with being fitted into the upper lens frame. Upper lens frame 21 is hollow and includes flange section 21a extending inside in the direction perpendicular to the optical axis, on its upper end. Image pickup lens 10 is arranged inside the flange section with being fitted to the flange section. Image pickup lens 10 is composed of, in order from the object side (upward in FIG. 2), aperture stop formed by an opening of flange section 21a, first lens L1 having positive refractive power and having a meniscus shape with a convex surface facing the object side and a concave surface facing the image side, second lens L2 including a concave surface facing the object side, and third lens L3 having negative refractive power. Each of lenses L1 to L3 is preferably formed of a heat-resistant material, for example a glass material.

The top surface of flange section L1a of first lens L1 comes in contact with the bottom surface of flange section 21a of upper lens frame 21. The top surface of flange section L2a of second lens L2 comes in contact with the bottom surface of flange section L1a of first lens L1 directly with supporting light-shielding member SH in a ring plate shape between the surfaces. The bottom surface of flange section L2a of second lens L2 comes in contact with the top surface of fixing member SP which is attached to upper lens frame 20, has a ring plate shape and doubles as a spacer. The top surface of flange section L3a, of third lens L3 comes in contact with the bottom surface of the fixing member SP. Thereby, distances between lenses can be adjusted correctly. At the center of flange section 21a of upper lens frame 21, as shown in the figure, an aperture stop in a circular shape is formed. The object-side optical surface of first lens L1 protrudes from the aperture stop toward the object side.

In the present embodiment, the following expressions (1) to (3) hold, where D4 is a distance (mm) of an air gap on an optical axis between second lens L2 and third lens L3, f is a focal length (mm) of the total system of the image pickup lens, f2 is a focal length (mm) of second lens L2, and r3 is a curvature radius (mm) of the surface facing the object side of the second lens.

$$0.10 < D4/f < 0.25 \quad (1)$$

$$0.00 \leq |f/f2| < 0.65 \quad (2)$$

$$-2.50 < f/r3 < 0.00 \quad (3)$$

In an assembling process, lower lens frame 20 to which plate PT has been joined is joined and bonded to substrate 52 so as to cover CMOS type image sensor 51 which has been arranged on substrate 52, and upper lens frame 21 in which first lens L1, light-shielding member SH, second lens L2, fixing member SP, third lens L3 are inserted in this order is bonded to lower lens frame 20. However, the assembling embodiment is not limited to the above. After lower lens frame 20 to which plate PT has been attached and upper lens frame 21 in which first lens L1, light-shielding member SH, second lens L2, fixing member SP, third lens L3 have been inserted in this order are bonded together, the resulting body may be bonded to substrate 52 so as to cover CMOS type image sensor 51 which has been arranged on substrate 52.

Next, a utilization embodiment of the above-described image pickup apparatus 50 will be described. Each of FIGS. 3a and 3b is a diagram showing a condition that image pickup apparatus 50 is mounted on cell phone 100 as a mobile terminal. FIG. 4 is a control block diagram of cell phone 100.

In image pickup apparatus 50, as shown in FIGS. 3a and 3b, for example, the object-side end surface of the image pickup lens is arranged on the rear surface (where it is assumed that the side of liquid crystal display section is the front) of cell phone 100, so as to be located at a position corresponding to an area below the liquid crystal display section. The arrangement of image pickup apparatus 50 is not limited to that.

The external connecting terminal (which is unillustrated) of image pickup apparatus 50 is connected with control section 101 of cell phone 100 to output image signals such as luminance signal and color difference signal to control section 101.

On the one hand, as shown in FIG. 4, cell phone 100 is provided with: control section (CPU) 101 which centrally controls respective sections and executes programs corresponding to various processing, input section 60 for indicating and inputting information such as number; display section 70 for displaying predetermined data and picked-up images; radio communication section 80 for realizing various kinds of information communication to an external server; storage section (ROM) 91 which stores system programs of the cell phone 100, various processing programs, and necessary data such as terminal ID; and temporary storage section (RAM) 92 which temporarily stores various processing programs and data to be processed by control section 101, processed data, and image data from the image pickup apparatus 50 and is used as a working area.

Image signal inputted from image pickup apparatus 50 is stored in nonvolatile storage section (flash memory) 93, is displayed on display section 70, or is transmitted to the outside as image information through radio communication section 80, by the control section 101 of cell phone 100. Further, cell phone 100 includes a microphone and speaker for inputting and outputting voices, which are not illustrated.

When a photographer holding cell phone 100 aims image pickup lens 10 of image pickup apparatus 50 at the photographic subject, image signal of a still image or movie is captured in image sensor 51. When the photographer pushes button BT in input section 60 shown in FIG. 3a at the desired timing of shooting, the shutter is released, which results in capturing image signal in image pickup apparatus 50. The image signal inputted in image pickup apparatus 50 is transmitted to the control section in the above-described cell phone 100, to be stored in nonvolatile storage section 93, be displayed in display section 70 or be transmitted outside as image information through radio communication section 80.

EXAMPLES

Next, examples suitable for the above-described embodiment will be described. However, the scope of the invention is not limited to the examples which will be described below. Symbols used in each example represent the followings.

f. Focal length of the total system of the image pickup lens
fB: Back focal length
F: F-number 2Y: Diagonal length of the image pickup plane of the solid-state image pickup element
r: Curvature radius
D: Surface distance on the optical axis
Nd: Refractive index of a lens material for d-line
vd: Abbe number of a lens material
ENTP: Position of the entrance pupil under the condition that the object-side surface of the first lens is assumed to be the basis
EXTP: Position of the exit pupil under the condition that the rearmost surface of the image pickup optical system is assumed to be the basis
H1: Position of the front principal point
H2: Position of the tear principal point In each example, a surface represented by a surface number followed by an asterisk "*" is a surface having an aspheric shape. The shape of the aspheric surface is expressed by the following Math. 1, where the peak of the surface is defined as the origin, X-axis extends along the optical axis direction, and h represents the height in a direction perpendicular to the optical axis. In the following descriptions (including data of Tables), the power of 10 (for example, $2.5 \times 10^{-02}$) will be expressed as by using "E" (for example, 2.5E-02). A blank in numerical data in Tables represents zero.

$$X = \frac{h^2/R}{1 + \sqrt{1-(1+K)h^2/R^2}} + \sum A_i h^i \quad \text{[Math. 1]}$$

In the expression, $A_i$ is i-th-order aspheric surface coefficient, R is a curvature radius, and K is a conic constant.

Example 1

Table 1 shows lens data of Example 1. FIG. 5 shows a sectional view of the image pickup lens of Example 1. In the figure, S represents an aperture stop, L1 represents the first lens having positive refractive power and having a meniscus shape with a convex surface facing the object side and a concave surface facing the image side, L2 represents the second lens having negative refractive power and having a meniscus shape with a concave surface facing the object side and a convex surface facing the image side, L3 represents the third lens having negative refractive power, having a meniscus shape with a convex surface facing the object side, and including an inflection point on each of the object-side surface and the image-side surface, PT represents a parallel flat plate which is assumed to be a component such as an optical low-pass filter and IR cut-off filter, CG represents a parallel flat plate which is assumed to be a component such as a seal glass of a solid-state image pickup element, and IM represents a solid-state image pickup element. FIGS. 6a, 6b, and 6c show aberration diagrams of spherical aberration, astigmatism, and distortion of the image pickup lens of Example 1. In the spherical aberration diagram, a dashed line and a solid line represent the amounts of spherical aberration for g-line and d-line, respectively. In the astigmatism diagram, the solid line represents a sagittal plane and the dashed line represents a meridional plane.

TABLE 1

| Example 1 | | | |
|---|---|---|---|
| f = 3.74 mm | fB = 0.12 mm | F = 2.84 | 2Y = 4.48 mm |
| ENTP = 0 mm | EXTP = −2.36 mm | H1 = −1.9 mm | H2 = −3.62 mm |

TABLE 1-continued

Example 1

| Surface No. | R(mm) | D(mm) | Nd | vd | Effective radius (mm) |
|---|---|---|---|---|---|
| 1 | ∞ | 0.05 | | | 0.65 |
| 2 | ∞ | −0.23 | | | 0.65 |
| 3* | 1.054 | 0.72 | 1.58020 | 56.3 | 0.67 |
| 4* | 2.027 | 0.39 | | | 0.61 |
| 5* | −3.116 | 0.55 | 1.80470 | 24.3 | 0.70 |
| 6* | −4.835 | 0.63 | | | 0.95 |
| 7* | 3.618 | 0.70 | 1.58020 | 56.3 | 1.52 |
| 8* | 2.161 | 0.19 | | | 1.85 |
| 9 | ∞ | 0.15 | 1.51390 | 60.7 | 2.09 |
| 10 | ∞ | 0.18 | | | 2.12 |
| 11 | ∞ | 0.50 | 1.46920 | 61.7 | 2.19 |
| 12 | ∞ | 0.12 | | | 2.33 |

*: Aspheric surface coefficient

| | |
|---|---|
| Third surface | K = −0.14294E+00 |
| | A4 = 0.38162E−01 |
| | A6 = 0.63170E−01 |
| | A8 = −0.20792E−01 |
| | A10 = 0.18432E+00 |
| | A12 = −0.48270E−01 |
| | A14 = 0.94529E−01 |
| Fourth surface | K = 0.80226E+01 |
| | A4 = 0.74974E−02 |
| | A6 = 0.64686E−01 |
| | A8 = 0.19354E+00 |
| | A10 = −0.50703E+00 |
| | A12 = −0.34529E+00 |
| | A14 = 0.59938E+01 |
| Fifth surface | K = −0.49984E+02 |
| | A4 = −0.31608E+00 |
| | A6 = 0.34755E+00 |
| | A8 = −0.17102E+00 |
| | A10 = −0.41506E+00 |
| | A12 = −0.13420E+01 |
| | A14 = 0.50594E+01 |
| | A16 = −0.27483E+01 |
| Sixth surface | K = 0.16674E+01 |
| | A4 = −0.79727E−01 |
| | A6 = 0.13899E+00 |
| | A8 = −0.44057E−01 |
| | A10 = −0.19369E−01 |
| | A12 = 0.16993E−01 |
| | A14 = 0.93716E−01 |
| | A16 = −0.80329E−01 |
| Seventh surface | K = −0.44874E+02 |
| | A4 = −0.14756E+00 |
| | A6 = 0.35194E−01 |
| | A8 = −0.32262E−02 |
| | A10 = 0.18592E−02 |
| | A12 = 0.36658E−03 |
| | A14 = −0.16039E−03 |
| | A16 = −0.31846E−04 |
| Eighth surface | K = −0.10719E+02 |
| | A4 = −0.96568E−01 |
| | A6 = 0.26771E−01 |
| | A8 = −0.11261E−01 |
| | A10 = 0.19879E−02 |
| | A12 = 0.15579E−03 |
| | A14 = −0.12433E−03 |
| | A16 = 0.15264E−04 |

Single lens data

| Lens block | Forefront surface | Focal length (mm) |
|---|---|---|
| 1 | 3 | 2.976 |
| 2 | 5 | −12.700 |
| 3 | 7 | −11.228 |

Example 2

Table 2 shows lens data of Example 2. FIG. 7 shows a sectional view of the image pickup lens of Example 2. In the figure, S represents an aperture stop, L1 represents the first lens having positive refractive power and having a meniscus shape with a convex surface facing the object side and a concave surface facing the image side, L2 represents the second lens having positive refractive power and having a meniscus shape with a concave surface facing the object side and a convex surface facing the image side, L3 represents the third lens having negative refractive power, having a meniscus shape with a convex surface facing the object side, and including an inflection point on each of the object-side surface and the image-side surface, PT represents a parallel flat plate which is assumed to be a component such as an optical low-pass filter and IR cut-off filter, CG represents a parallel flat plate which is assumed to be a component such as a seal glass of a solid-state image pickup element, and IM represents a solid-state image pickup element. FIGS. 8a, 8b, and 8c show aberration diagrams of spherical aberration, astigmatism, and distortion of the image pickup lens of Example 2. In the spherical aberration diagram, a dashed line and a solid line represent the amounts of spherical aberration for g-line and d-line, respectively. In the astigmatism diagram, the solid line represents a sagittal plane and the dashed line represents a meridional plane.

TABLE 2

Example 2 f = 3.74 mm    fB = 0.13 mm    F = 2.84    2Y = 4.48 mm
ENTP = 0 mm    EXTP = −2.38 mm    H1 = −1.85 mm    H2 = −3.61 mm

| Surface No. | R(mm) | D(mm) | Nd | vd | Effective radius (mm) |
|---|---|---|---|---|---|
| 1 | ∞ | 0.05 | | | 0.65 |
| 2 | ∞ | −0.21 | | | 0.65 |
| 3* | 1.127 | 0.69 | 1.58020 | 56.3 | 0.66 |
| 4* | 2.201 | 0.52 | | | 0.64 |
| 5* | −2.280 | 0.55 | 1.58020 | 56.3 | 0.76 |
| 6* | −2.474 | 0.61 | | | 1.00 |
| 7* | 3.534 | 0.61 | 1.58020 | 56.3 | 1.51 |
| 8* | 1.780 | 0.20 | | | 1.84 |
| 9 | ∞ | 0.15 | 1.51390 | 60.7 | 2.08 |
| 10 | ∞ | 0.18 | | | 2.12 |
| 11 | ∞ | 0.50 | 1.46920 | 61.7 | 2.19 |
| 12 | ∞ | 0.13 | | | 2.33 |

Aspheric surface coefficient

| | |
|---|---|
| Third surface | K = −0.16065E+00 |
| | A4 = 0.36307E−01 |
| | A6 = 0.73927E−01 |
| | A8 = −0.60479E−01 |
| | A10 = 0.13803E+00 |
| | A12 = 0.16821E+00 |
| | A14 = −0.19006E+00 |
| Fourth surface | K = 0.65088E+01 |
| | A4 = 0.43977E−01 |
| | A6 = 0.70312E−01 |
| | A8 = 0.25260E+00 |
| | A10 = 0.24832E+00 |
| | A12 = −0.19076E+01 |
| | A14 = 0.57815E+01 |
| Fifth surface | K = −0.14935E+02 |
| | A4 = −0.28182E+00 |
| | A6 = 0.14865E+00 |
| | A8 = 0.60631E−01 |
| | A10 = 0.26416E+00 |
| | A12 = −0.17018E+01 |
| | A14 = 0.35440E+01 |
| | A16 = −020804E+01 |
| Sixth surface | K = −0.20549E+01 |
| | A4 = −0.13239E+00 |
| | A6 = 0.13404E+00 |
| | A8 = 0.13421E−01 |

TABLE 2-continued

Example 2

| | |
|---|---|
| Seventh surface | A10 = −0.36910E−01<br>A12 = 0.30183E−01<br>A14 = 0.10028E+00<br>A16 = −0.82484E−01<br>K = −0.42140E+02<br>A4 = −0.22333E+00<br>A6 = 0.74301E−01<br>A8 = −0.10163E−01<br>A10 = −0.51029E−03<br>A12 = 0.19621E−02<br>A14 = −0.15602E−03<br>A16 = −0.11872E−03 |
| Eighth surface | K = −0.10411E+02<br>A4 = −0.11511E+00<br>A6 = 0.32495E−01<br>A8 = −0.10621E−01<br>A10 = 0.16396E−02<br>A12 = 0.15521E−03<br>A14 = −0.12966E−03<br>A16 = 0.18035E−04 |

Single lens data

| Lens block | Forefront surface | Focal length (mm) |
|---|---|---|
| 1 | 3 | 3.219 |
| 2 | 5 | 1191.466 |
| 3 | 7 | −7.087 |

Example 3

Table 3 shows lens data of Example 3. FIG. 9 shows a sectional view of the image pickup lens of Example 3. In the figure, S represents an aperture stop, L1 represents the first lens having positive refractive power and having a meniscus shape with a convex surface facing the object side and a concave surface facing the image side, L2 represents the second lens having negative refractive power and having a meniscus shape with a concave surface facing the object side and a convex surface king the image side, L3 represents the third lens having negative refractive power, including concave surfaces facing the object side and the image side, and including an inflection point on the image-side surface, PT represents a parallel flat plate which is assumed to be a component such as an optical low-pass filter and IR cut-off filter, CG represents a parallel flat plate which is assumed to be a component such as a seal glass of a solid-state image pickup element, and IM represents a solid-state image pickup element. FIGS. 10*a*, 10*b*, and 10*c* show aberration diagrams of spherical aberration, astigmatism, and distortion of the image pickup lens of Example 3. In the spherical aberration diagram, a dashed line and a solid line represent the amounts of spherical aberration for g-line and d-line, respectively. In the astigmatism diagram, the solid line represents a sagittal plane and the dashed line represents a meridional plane.

TABLE 3

Example 3

| f = 3.75 mm | fB = 0.06 mm | F = 2.85 | 2Y = 4.48 mm |
|---|---|---|---|
| ENTP = 0 mm | EXTP = −2.27 mm | H1 = −2.35 mm | H2 = −3.72 mm |

| Surface No. | R(mm) | D(mm) | Nd | vd | Effective radius (mm) |
|---|---|---|---|---|---|
| 1 | ∞ | 0.00 | | | 0.66 |
| 2 | ∞ | −0.22 | | | 0.66 |

TABLE 3-continued

Example 3

| 3* | 1.074 | 0.67 | 1.58310 | 59.5 | 0.66 |
|---|---|---|---|---|---|
| 4* | 3.238 | 0.51 | | | 0.66 |
| 5* | −1.618 | 0.50 | 1.80540 | 26.1 | 0.65 |
| 6* | −2.209 | 0.56 | | | 0.93 |
| 7* | −11.957 | 0.77 | 1.58310 | 59.5 | 1.47 |
| 8* | 3.535 | 0.15 | | | 1.85 |
| 9 | ∞ | 0.15 | 1.51630 | 64.1 | 2.50 |
| 10 | ∞ | 0.12 | | | 2.50 |
| 11 | ∞ | 0.50 | 1.51630 | 64.1 | 2.50 |
| 12 | ∞ | 0.06 | | | 2.50 |

Aspheric surface coefficient

| | |
|---|---|
| Third surface | K = 0.77576E−01<br>A4 = −0.43734E−02<br>A6 = −0.57588E−01<br>A8 = 0.19682E+00<br>A10 = −0.44927E+00<br>A12 = 0.22994E+00 |
| Fourth surface | K = 0.17855E+02<br>A4 = −0.75404E−01<br>A6 = −0.16731E+00<br>A8 = −0.93226E−01<br>A10 = −0.17365E+00<br>A12 = −0.14604E+01 |
| Fifth surface | K = −0.32941E+01<br>A4 = −0.35185E+00<br>A6 = 0.55436E+00<br>A8 = −0.60869E+01<br>A10 = 0.20013E+02<br>A12 = −0.27998E+02 |
| Sixth surface | K = 0.64933E+00<br>A4 = −0.32956E−01<br>A6 = −0.19114E−02<br>A8 = 0.17176E+00<br>A10 = −0.47875E−01<br>A12 = 0.14935E−01 |
| Seventh surface | K = −0.20704E+02<br>A4 = −0.19701E+00<br>A6 = 0.59140E−01<br>A8 = 0.15397E−01<br>A10 = −0.20960E−02<br>A12 = −0.27374E−02<br>A14 = 0.53450E−03 |
| Eighth surface | K = −0.32968E+02<br>A4 = −0.82174E−01<br>A6 = 0.31362E−02<br>A8 = −0.17062E−03<br>A10 = 0.14061E−02<br>A12 = −0.76479E−03<br>A14 = 0.10113E−03 |

Single lens data

| Lens block | Forefront surface | Focal length (mm) |
|---|---|---|
| 1 | 3 | 2.471 |
| 2 | 5 | −12.072 |
| 3 | 7 | −4.594 |

Example 4

Table 4 shows lens data of Example 4. FIG. 11 shows a sectional view of the image pickup lens of Example 4. In the figure, S represents an aperture stop, L1 represents the first lens having positive refractive power and having a meniscus shape with a convex surface facing the object side and a concave surface facing the image side, L2 represents the second lens having negative refractive power and having a meniscus shape with a concave surface facing the object side and a convex surface facing the image side, L3 represents the third lens having negative refractive power, having a meniscus shape with a convex surface facing the object side, and including an inflection point on each of the object-side surface and the image-side surface, PT represents a parallel flat plate which is assumed to be a component such as an optical low-pass filter and IR cut-off filter, CG represents a parallel flat plate which is assumed to be a component such as a seal glass of a solid-state image pickup element, and IM represents a solid-state image pickup element. FIGS. 12a, 12b, and 12c show aberration diagrams of spherical aberration, astigmatism, and distortion of the image pickup lens of Example 4. In the spherical aberration diagram, a dashed line and a solid line represent the amounts of spherical aberration for g-line and d-line, respectively. In the astigmatism diagram, the solid line represents a sagittal plane and the dashed line represents a meridional plane.

TABLE 4

Example 4

| f = 3.71 mm | fB = 0.12 mm | F = 2.88 | 2Y = 4.48 mm |
|---|---|---|---|
| ENTP = 0 mm | EXTP = −2.29 mm | H1 = −2 mm | H2 = −3.59 mm |

| Surface No. | R(mm) | D(mm) | Nd | νd | Effective radius (mm) |
|---|---|---|---|---|---|
| 1 | ∞ | 0.05 | | | 0.64 |
| 2 | ∞ | −0.22 | | | 0.64 |
| 3* | 1.046 | 0.64 | 1.58020 | 56.3 | 0.64 |
| 4* | 2.349 | 0.55 | | | 0.62 |
| 5* | −2.623 | 0.50 | 1.80470 | 24.3 | 0.68 |
| 6* | −5.254 | 0.45 | | | 0.99 |
| 7* | 3.543 | 0.77 | 1.58020 | 56.3 | 1.51 |
| 8* | 2.227 | 0.18 | | | 1.85 |
| 9 | ∞ | 0.15 | 1.51390 | 60.7 | 3.00 |
| 10 | ∞ | 0.18 | | | 3.00 |
| 11 | ∞ | 0.50 | 1.52040 | 52.0 | 3.00 |
| 12 | ∞ | 0.12 | | | 3.00 |

Aspheric surface coefficient

| Third surface | K = −0.18419E+00 |
| | A4 = 0.30273E−01 |
| | A6 = 0.74560E−01 |
| | A8 = −0.65954E−01 |
| | A10 = 0.81976E−01 |
| | A12 = 0.86558E−01 |
| | A14 = 0.18458E+00 |
| Fourth surface | K = 0.10553E+02 |
| | A4 = −0.24998E−01 |
| | A6 = −0.13800E+00 |
| | A8 = 0.38914E+00 |
| | A10 = −0.68935E+00 |
| | A12 = −0.26705E+01 |
| | A14 = 0.42813E+01 |
| Fifth surface | K = −0.32944E+02 |
| | A4 = −0.39851E+00 |
| | A6 = 0.17092E+00 |
| | A8 = −0.74197E+00 |
| | A10 = 0.18564E+00 |
| | A12 = 0.20367E+01 |
| | A14 = −0.23722E+01 |
| | A16 = −0.10792E+02 |
| Sixth surface | K = 0.12434E+02 |
| | A4 = −0.11677E+00 |
| | A6 = 0.71559E−01 |
| | A8 = 0.31016E−02 |
| | A10 = 0.20201E−01 |
| | A12 = −0.14425E−01 |
| | A14 = −0.17903E−01 |
| | A16 = 0.24104E−01 |
| Seventh surface | K = −0.50000E+02 |
| | A4 = −0.17378E+00 |
| | A6 = 0.39679E−01 |
| | A8 = 0.44360E−02 |
| | A10 = 0.11508E−02 |
| | A12 = −0.17953E−03 |
| | A14 = −0.31225E−03 |
| | A16 = 0.36588E−04 |

TABLE 4-continued

Example 4

| Eighth surface | K = −0.15765E+02 |
| | A4 = −0.85782E−01 |
| | A6 = 0.96683E−02 |
| | A8 = −0.14974E−02 |
| | A10 = 0.13844E−03 |
| | A12 = −0.18312E−04 |
| | A14 = −0.41008E−04 |
| | A16 = 0.10859E−04 |

Single lens data

| Lens block | Forefront surface | Focal length (mm) |
|---|---|---|
| 1 | 3 | 2.755 |
| 2 | 5 | −7.111 |
| 3 | 7 | −13.160 |

Example 5

Table 5 shows lens data of Example 5. FIG. 13 shows a sectional view of the image pickup lens of Example 5. In the figure, S represents an aperture stop, L1 represents the first lens having positive refractive power and having a meniscus shape with a convex surface facing the object side and a concave surface facing the image side, L2 represents the second lens having negative refractive power and having a meniscus shape with a concave surface facing the object side and a convex surface facing the image side, L3 represents the third lens having negative refractive power, having a meniscus shape with a convex surface facing the object side, and including an inflection point on each of the object-side surface and the image-side surface, PT represents a parallel flat plate which is assumed to be a component such as an optical low-pass filter and a cut-off filter, CG represents a parallel flat plate which is assumed to be a component such as a seal glass of a solid-state image pickup element, and IM represents a solid-state image pickup element. FIGS. 14a, 14b, and 14c show aberration diagrams of spherical aberration, astigmatism, and distortion of the image pickup lens of Example 5. In the spherical aberration diagram, a dashed line and a solid line represent the amounts of spherical aberration for g-line and d-line, respectively. In the astigmatism diagram, the solid line represents a sagittal plane and the dashed line represents a meridional plane.

TABLE 5

Example 5

| f = 3.68 mm | fB = 0.19 mm | F = 2.88 | 2Y = 4.48 mm |
|---|---|---|---|
| ENTP = 0 mm | EXTP = −2.24 mm | H1 = −1.88 mm | H2 = −3.49 mm |

| Surface No. | R(mm) | D(mm) | Nd | νd | Effective radius (mm) |
|---|---|---|---|---|---|
| 1 | ∞ | 0.05 | | | 0.64 |
| 2 | ∞ | −0.23 | | | 0.64 |
| 3* | 1.103 | 0.78 | 1.56910 | 71.3 | 0.65 |
| 4* | 1.907 | 0.52 | | | 0.57 |
| 5* | −20.461 | 0.35 | 1.81360 | 25.7 | 0.60 |
| 6* | −46.751 | 0.54 | | | 0.64 |
| 7* | 4.723 | 0.68 | 1.58310 | 59.4 | 0.72 |
| 8* | 2.568 | 0.18 | | | 0.82 |
| 9 | ∞ | 0.15 | 1.51630 | 64.1 | 0.84 |
| 10 | ∞ | 0.10 | | | 0.86 |
| 11 | ∞ | 0.50 | 1.47140 | 65.2 | 0.88 |
| 12 | ∞ | 0.19 | | | 0.96 |

TABLE 5-continued

Example 5

Aspheric surface coefficient

| Surface | Coefficients |
|---|---|
| Third surface | K = −0.21269E+00<br>A4 = 0.25354E−01<br>A6 = 0.51217E−01<br>A8 = −0.59367E−01<br>A10 = 0.16671E+00<br>A12 = −0.54421E−01<br>A14 = −0.50297E−01 |
| Fourth surface | K = 0.53183E+01<br>A4 = 0.38866E−01<br>A6 = −0.16114E+00<br>A8 = 0.55595E+00<br>A10 = 0.15889E−01<br>A12 = −0.33486E+01<br>A14 = 0.60251E+01 |
| Fifth surface | K = 0.22604E+02<br>A4 = −0.13724E+00<br>A6 = 0.10528E+00<br>A8 = −0.30220E+00<br>A10 = 0.75871E−01<br>A12 = −0.82806E+00<br>A14 = 0.22983E+01<br>A16 = −0.19669E+01 |
| Sixth surface | K = −0.20092E+02<br>A4 = −0.10906E+00<br>A6 = 0.98257E−01<br>A8 = −0.61897E−01<br>A10 = −0.36697E−01<br>A12 = −0.10376E−02<br>A14 = 0.92352E−01<br>A16 = −0.51148E−01 |
| Seventh surface | K = −0.28171E+02<br>A4 = −0.17472E+00<br>A6 = 0.40236E−01<br>A8 = 0.19907E−02<br>A10 = 0.26041E−02<br>A12 = −0.26347E−03<br>A14 = −0.53847E−03<br>A16 = 0.93487E−04 |
| Eighth surface | K = −0.72818E+01<br>A4 = −0.10993E+00<br>A6 = 0.26273E−01<br>A8 = −0.11106E−01<br>A10 = 0.21326E−02<br>A12 = 0.15579E−03<br>A14 = −0.12433E−03<br>A16 = 0.15264E−04 |

Single lens data

| Lens block | Forefront surface | Focal length (mm) |
|---|---|---|
| 1 | 3 | 3.401 |
| 2 | 5 | −44.991 |
| 3 | 7 | −10.921 |

Example 6

Table 6 shows lens data of Example 6. FIG. 15 shows a sectional view of the image pickup lens of Example 6. In the figure, S represents an aperture stop, L1 represents the first lens having positive refractive power and having a meniscus shape with a convex surface facing the object side and a concave surface facing the image side, L2 represents the second lens having positive refractive power and having a meniscus shape with a concave surface facing the object side and a convex surface facing the image side, L3 represents the third lens having negative refractive power, having a meniscus shape with a convex surface facing the object side, and including an inflection point on each of the object-side surface and the image-side surface, PT represents a parallel flat plate which is assumed to be a component such as an optical low-pass filter and IR cut-off filter, CG represents a parallel flat plate which is assumed to be a component such as a seal glass of a solid-state image pickup element, and IM represents a solid-state image pickup element. FIGS. 16a, 16b, and 16c show aberration diagrams of spherical aberration, astigmatism, and distortion of the image pickup lens of Example 6. In the spherical aberration diagram, a dashed line and a solid line represent the amounts of spherical aberration for g-line and d-line, respectively. In the astigmatism diagram, the solid line represents a sagittal plane and the dashed line represents a meridional plane.

TABLE 6

Example 6 f = 3.62 mm  fB = 0.12 mm  F = 2.84  2Y = 4.48 mm
ENTP = 0 mm  EXTP = −2.34 mm  H1 = −1.72 mm  H2 = −3.5 mm

| Surface No. | R(mm) | D(mm) | Nd | vd | Effective radius (mm) |
|---|---|---|---|---|---|
| 1 | ∞ | 0.05 | | | 0.63 |
| 2 | ∞ | −0.23 | | | 0.63 |
| 3* | 1.031 | 0.66 | 1.58020 | 56.3 | 0.64 |
| 4* | 1.882 | 0.58 | | | 0.55 |
| 5* | −2.097 | 0.40 | 1.80470 | 24.3 | 0.57 |
| 6* | −2.270 | 0.70 | | | 0.66 |
| 7* | 7.620 | 0.54 | 1.58020 | 56.3 | 0.76 |
| 8* | 2.586 | 0.18 | | | 0.83 |
| 9 | ∞ | 0.15 | 1.51390 | 60.7 | 0.86 |
| 10 | ∞ | 0.10 | | | 0.88 |
| 11 | ∞ | 0.50 | 1.46920 | 61.7 | 0.90 |
| 12 | ∞ | 0.12 | | | 0.98 |

Aspheric surface coefficient

| Surface | Coefficients |
|---|---|
| Third surface | K = −0.12989E+00<br>A4 = 0.35854E−01<br>A6 = 0.81004E−01<br>A8 = −0.18889E−01<br>A10 = 0.19757E+00<br>A12 = −0.27042E+00<br>A14 = 0.46853E+00 |
| Fourth surface | K = 0.69301E+01<br>A4 = 0.33340E−01<br>A6 = −0.66075E−01<br>A8 = 0.42942E+00<br>A10 = −0.36034E+00<br>A12 = −0.20868E+01<br>A14 = 0.59938E+01 |
| Fifth surface | K = −0.14263E+02<br>A4 = −0.31713E+00<br>A6 = 0.28982E+00<br>A8 = −0.46180E+00<br>A10 = −0.37387E+00<br>A12 = −0.35973E+00<br>A14 = 0.58538E+01<br>A16 = −0.75098E+01 |
| Sixth surface | K = −0.44822E+01<br>A4 = −0.85434E−01<br>A6 = 0.69014E−01<br>A8 = −0.42386E−01<br>A10 = 0.88534E−02<br>A12 = 0.23549E−01<br>A14 = 0.90293E−01<br>A16 = −0.88386E−01 |
| Seventh surface | K = −0.50000E+02<br>A4 = −0.15163E+00<br>A6 = 0.40238E−01<br>A8 = −0.25854E−02<br>A10 = 0.14934E−02<br>A12 = 0.54040E−04<br>A14 = −0.28551E−03<br>A16 = 0.44231E−04 |

TABLE 6-continued

Example 6

| | |
|---|---|
| Eighth surface | K = −0.66972E+01 |
| | A4 = −0.10839E+00 |
| | A6 = 0.27237E−01 |
| | A8 = −0.10388E−01 |
| | A10 = 0.19397E−02 |
| | A12 = 0.15579E−03 |
| | A14 = −0.12433E−03 |
| | A16 = 0.15264E−04 |

Single lens data

| Lens block | Forefront surface | Focal length (mm) |
|---|---|---|
| 1 | 3 | 3.063 |
| 2 | 5 | 1503.269 |
| 3 | 7 | −7.027 |

Example 7

Table 7 shows lens data of Example 7. FIG. 17 shows a sectional view of the image pickup lens of Example 7. In the figure, S represents an aperture stop, L1 represents the first lens having positive refractive power and having a meniscus shape with a convex surface facing the object side and a concave surface facing the image side, L2 represents the second lens having positive refractive power and having a meniscus shape with a concave surface facing the object side and a convex surface facing the image side, L3 represents the third lens having negative refractive power, having a meniscus shape with a convex surface facing the object side, and including an inflection point on each of the object-side surface and the image-side surface, PT represents a parallel flat plate which is assumed to be a component such as an optical low-pass filter and IR cut-off filter, CG represents a parallel flat plate which is assumed to be a component such as a seal glass of a solid-state image pickup element, and IM represents a solid-state image pickup element. FIGS. 18a, 18b, and 18c show aberration diagrams of spherical aberration, astigmatism, and distortion of the image pickup lens of Example 7. In the spherical aberration diagram, a dashed line and a solid line represent the amounts of spherical aberration for g-line and d-line, respectively. In the astigmatism diagram, the solid line represents a sagittal plane and the dashed line represents a meridional plane.

TABLE 7

Example 7

| f = 3.39 mm | fB = 0.1 mm | F = 2.84 | 2Y = 4.48 mm |
|---|---|---|---|
| ENTP = 0 mm | EXTP = −2.24 mm | H1 = −1.52 mm | H2 = −3.29 mm |

| Surface No. | R(mm) | D(mm) | Nd | νd | Effective radius (mm) |
|---|---|---|---|---|---|
| 1 | ∞ | 0.05 | | | 0.60 |
| 2 | ∞ | −0.23 | | | 0.60 |
| 3* | 1.031 | 0.71 | 1.56910 | 71.3 | 0.60 |
| 4* | 1.981 | 0.39 | | | 0.53 |
| 5* | −2.569 | 0.55 | 1.81360 | 25.7 | 0.55 |
| 6* | −2.808 | 0.65 | | | 0.65 |
| 7* | 3.252 | 0.56 | 1.58310 | 59.4 | 0.75 |
| 8* | 1.795 | 0.20 | | | 0.82 |
| 9 | ∞ | 0.15 | 1.51630 | 64.1 | 0.85 |
| 10 | ∞ | 0.10 | | | 0.87 |
| 11 | ∞ | 0.50 | 1.47140 | 65.2 | 0.90 |
| 12 | ∞ | 0.10 | | | 0.98 |

TABLE 7-continued

Example 7

Aspheric surface coefficient

| | |
|---|---|
| Third surface | K = −0.13449E+00 |
| | A4 = 0.39886E−01 |
| | A6 = 0.66366E−01 |
| | A8 = −0.18976E−01 |
| | A10 = 0.19128E+00 |
| | A12 = −0.29826E−01 |
| | A14 = 0.76240E−01 |
| Fourth surface | K = 0.74687E+01 |
| | A4 = 0.27397E−01 |
| | A6 = 0.78392E−02 |
| | A8 = 0.19742E+00 |
| | A10 = −0.28319E+00 |
| | A12 = −0.49190E+00 |
| | A14 = 0.59938E+01 |
| Fifth surface | K = −0.26102E+02 |
| | A4 = −0.33539E+00 |
| | A6 = 0.27367E+00 |
| | A8 = −0.27429E+00 |
| | A10 = −0.33272E+00 |
| | A12 = −0.10195E+01 |
| | A14 = 0.35232E+01 |
| | A16 = −0.27483E+01 |
| Sixth surface | K = 0.23386E+01 |
| | A4 = −0.74690E−01 |
| | A6 = 0.11859E+00 |
| | A8 = −0.47898E−01 |
| | A10 = −0.19613E−01 |
| | A12 = 0.16142E−01 |
| | A14 = 0.96339E−01 |
| | A16 = −0.74998E−01 |
| Seventh surface | K = −0.50000E+02 |
| | A4 = −0.16272E+00 |
| | A6 = 0.37221E−01 |
| | A8 = −0.26682E−02 |
| | A10 = 0.17860E−02 |
| | A12 = 0.26062E−03 |
| | A14 = −0.18932E−03 |
| | A16 = −0.79133E−05 |
| Eighth surface | K = −0.11100E+02 |
| | A4 = −0.93971E−01 |
| | A6 = 0.23628E−01 |
| | A8 = −0.11736E−01 |
| | A10 = 0.22421E−02 |
| | A12 = 0.15579E−03 |
| | A14 = −0.12433E−03 |
| | A16 = 0.15264E−04 |

Single lens data

| Lens block | Forefront surface | Focal length (mm) |
|---|---|---|
| 1 | 3 | 2.976 |
| 2 | 5 | 1153.526 |
| 3 | 7 | −7.991 |

Example 8

Table 8 shows lens data of Example 8. FIG. 19 shows a sectional view of the image pickup lens of Example 8. In the figure, S represents an aperture stop, L1 represents the first lens having positive refractive power and having a meniscus shape with a convex surface facing the object side and a concave surface facing the image side, L2 represents the second lens having negative refractive power and including a concave surface facing the object side and a concave surface facing the image side, L3 represents the third lens having negative refractive power, having a meniscus shape with a convex surface facing the object side, and including an inflection point on each of the object-side surface and the image-side surface, PT represents a parallel flat plate which is assumed to be a component such as an optical low-pass filter and IR cut-off filter, CG represents a parallel flat plate which is assumed to be a component such as a seal glass of a solid-state image pickup element, and IM represents a solid-state image pickup element. FIGS. 20a, 20b, and 20c show aberration diagrams of spherical aberration, astigmatism, and distortion of the image pickup lens of Example 8. In the spherical aberration diagram, a dashed line and a solid line represent the amounts of spherical aberration for g-line and d-line, respectively. In the astigmatism diagram, the solid line represents a sagittal plane and the dashed line represents a meridional plane.

TABLE 8

Example 8 f = 3.68 mm  fB = 0.19 mm  F = 2.88  2Y = 4.48 mm
ENTP = 0 mm  EXTP = −2.15 mm  H1 = −2.09 mm  H2 = −3.49 mm

| Surface No. | R(mm) | D(mm) | Nd | vd | Effective radius (mm) |
|---|---|---|---|---|---|
| 1 | ∞ | 0.05 | | | 0.64 |
| 2 | ∞ | −0.23 | | | 0.64 |
| 3* | 1.060 | 0.80 | 1.56910 | 71.3 | 0.65 |
| 4* | 1.809 | 0.53 | | | 0.55 |
| 5* | −150.540 | 0.30 | 1.81360 | 25.7 | 0.59 |
| 6* | 9.457 | 0.43 | | | 0.62 |
| 7* | 3.094 | 0.70 | 1.58310 | 59.4 | 0.71 |
| 8* | 2.246 | 0.19 | | | 0.80 |
| 9 | ∞ | 0.15 | 1.51630 | 64.1 | 0.82 |
| 10 | ∞ | 0.10 | | | 0.85 |
| 11 | ∞ | 0.50 | 1.47140 | 65.2 | 0.87 |
| 12 | ∞ | 0.19 | | | 0.95 |

Aspheric surface coefficient

| | |
|---|---|
| Third surface | K = −0.21132E+00<br>A4 = 0.25157E−01<br>A6 = 0.57169E−01<br>A8 = −0.53583E−01<br>A10 = 0.17446E+00<br>A12 = −0.49898E−01<br>A14 = −0.64533E−01 |
| Fourth surface | K = 0.53495E+01<br>A4 = 0.41313E−01<br>A6 = −0.15012E+00<br>A8 = 0.58596E+00<br>A10 = 0.69349E−01<br>A12 = −0.32662E+01<br>A14 = 0.62554E+01 |
| Fifth surface | K = 0.54383E+00<br>A4 = −0.15035E+00<br>A6 = 0.87564E−01<br>A8 = −0.30077E+00<br>A10 = 0.63234E−01<br>A12 = −0.84388E+00<br>A14 = 0.22945E+01<br>A16 = −0.19267E+01 |
| Sixth surface | K = −0.44723E+02<br>A4 = −0.11815E+00<br>A6 = 0.97851E−01<br>A8 = −0.64397E−01<br>A10 = −0.34183E−01<br>A12 = −0.56317E−03<br>A14 = 0.91134E−01<br>A16 = −0.53866E−01 |
| Seventh surface | K = −0.11656E+02<br>A4 = −0.16913E+00<br>A6 = 0.41204E−01<br>A8 = 0.16015E−02<br>A10 = 0.23538E−02<br>A12 = −0.34018E−03<br>A14 = −0.55183E−03<br>A16 = 0.96269E−04 |

TABLE 8-continued

Example 8

| | |
|---|---|
| Eighth surface | K = −0.63476E+01<br>A4 = −0.11136E+00<br>A6 = 0.23821E−01<br>A8 = −0.11363E−01<br>A10 = 0.22894E−02<br>A12 = 0.15579E−03<br>A14 = −0.12433E−03<br>A16 = 0.15264E−04 |

Single lens data

| Lens block | Forefront surface | Focal length (mm) |
|---|---|---|
| 1 | 3 | 3.241 |
| 2 | 5 | −10.927 |
| 3 | 7 | −20.138 |

Example 9

Table 9 shows lens data of Example 9. FIG. 21 shows a sectional view of the image pickup lens of Example 9. In the figure, S represents an aperture stop, L1 represents the first lens having positive refractive power and having a meniscus shape with a convex surface facing the object side and a concave surface facing the image side, L2 represents the second lens having negative refractive power and including a concave surface facing the object side and a concave surface facing the image side, L3 represents the third lens having negative refractive power, having a meniscus shape with a convex surface facing the object side, and including inflection points on the object-side surface and the image-side surface, PT represents a parallel flat plate which is assumed to be a component such as an optical low-pass filter and IR cut-off filter, CG represents a parallel flat plate which is assumed to be a component such as a seal glass of a solid-state image pickup element, and IM represents a solid-state image pickup element. FIGS. 22a, 22b, and 22c show aberration diagrams of spherical aberration, astigmatism, and distortion of the image pickup lens of Example 9. In the spherical aberration diagram, a dashed line and a solid line represent the amounts of spherical aberration for g-line and d-line, respectively. In the astigmatism diagram, the solid line represents a sagittal plane and the dashed line represents a meridional plane.

TABLE 9

Example 9 f = 3.74 mm  fB = 0.11 mm  F = 2.88  2Y = 4.48 mm
ENTP = 0 mm  EXTP = −2.38 mm  H1 = −1.86 mm  H2 = −3.62 mm

| Surface No. | R(mm) | D(mm) | Nd | vd | Effective radius (mm) |
|---|---|---|---|---|---|
| 1 | ∞ | 0.05 | | | 0.65 |
| 2 | ∞ | −0.23 | | | 0.65 |
| 3* | 1.031 | 0.76 | 1.58310 | 59.4 | 0.65 |
| 4* | 1.815 | 0.39 | | | 0.60 |
| 5* | −6.508 | 0.55 | 1.81360 | 25.7 | 0.71 |
| 6* | 100.000 | 0.44 | | | 1.02 |
| 7* | 3.804 | 0.81 | 1.58310 | 59.4 | 1.46 |
| 8* | 3.046 | 0.16 | | | 1.80 |
| 9 | ∞ | 0.21 | 1.51630 | 64.1 | 2.50 |
| 10 | ∞ | 0.18 | | | 2.50 |
| 11 | ∞ | 0.50 | 1.47140 | 65.2 | 2.50 |
| 12 | ∞ | 0.11 | | | 2.50 |

TABLE 9-continued

Example 9

Aspheric surface coefficient

| | |
|---|---|
| Third surface | K = −0.83742E−01 |
| | A4 = 0.28820E−01 |
| | A6 = 0.35302E−01 |
| | A8 = 0.10084E−01 |
| | A10 = 0.21654E+00 |
| | A12 = −0.35497E+00 |
| | A14 = 0.37766E+00 |
| Fourth surface | K = 0.65516E+01 |
| | A4 = −0.10869E−03 |
| | A6 = 0.74388E−01 |
| | A8 = −0.69925E−01 |
| | A10 = 0.13838E+00 |
| | A12 = −0.83688E+00 |
| | A14 = 0.52217E+01 |
| Fifth surface | K = 0.10808E+01 |
| | A4 = −0.14007E+00 |
| | A6 = −0.23281E−01 |
| | A8 = −0.20583E+00 |
| | A10 = 0.96312E+00 |
| | A12 = −0.17639E+01 |
| | A14 = −0.33155E+01 |
| | A16 = 0.79428E+01 |
| Sixth surface | K = 0.50000E+02 |
| | A4 = −0.11323E+00 |
| | A6 = 0.12099E+00 |
| | A8 = −0.12418E−01 |
| | A10 = −0.67300E−01 |
| | A12 = −0.11616E−01 |
| | A14 = 0.11705E+00 |
| | A16 = −0.65573E−01 |
| Seventh surface | K = −0.45758E+02 |
| | A4 = −0.13068E+00 |
| | A6 = 0.35225E−01 |
| | A8 = −0.28495E−02 |
| | A10 = 0.14438E−02 |
| | A12 = 0.10222E−02 |
| | A14 = −0.57854E−03 |
| | A16 = 0.26718E−04 |
| Eighth surface | K = −0.81991E+01 |
| | A4 = −0.10799E+00 |
| | A6 = 0.31590E−01 |
| | A8 = −0.11586E−01 |
| | A10 = 0.13679E−02 |
| | A12 = 0.30087E−03 |
| | A14 = −0.11763E−03 |
| | A16 = 0.12590E−04 |

Single lens data

| Lens block | Forefront surface | Focal length (mm) |
|---|---|---|
| 1 | 3 | 3.016 |
| 2 | 5 | −7.493 |
| 3 | 7 | −43.139 |

Example 10

Table 10 shows lens data of Example 10. FIG. 23 shows a sectional view of the image pickup lens of Example 10. In the figure, S represents an aperture stop, L1 represents the first lens having positive refractive power and having a meniscus shape with a convex surface facing the object side and a concave surface facing the image side, L2 represents the second lens having positive refractive power and having a meniscus shape with a concave surface facing the object side and a convex surface facing the image side, L3 represents the third lens having negative refractive power, including concave surfaces facing the object side and the image side and including inflection points on the image-side surface, PT represents a parallel flat plate which is assumed to be a component such as an optical low-pass filter and IR cut-off filter, CG represents a parallel flat plate which is assumed to be a component such as a seal glass of a solid-state image pickup element, and IM represents a solid-state image pickup element. FIGS. 24a, 24b, and 24c show aberration diagrams of spherical aberration, astigmatism, and distortion of the image pickup lens of Example 10. In the spherical aberration diagram, a dashed line and a solid line represent the amounts of spherical aberration for g-line and d-line, respectively. In the astigmatism diagram, the solid line represents a sagittal plane and the dashed line represents a meridional plane.

TABLE 10

Example 10

| f = 3.73 mm | fB = 0.11 mm | F = 2.83 | 2Y = 4.48 mm |
|---|---|---|---|
| ENTP = 0 mm | EXTP = −2.45 mm | H1 = −1.7 mm | H2 = −3.62 mm |

| Surface No. | R(mm) | D(mm) | Nd | νd | Effective radius (mm) |
|---|---|---|---|---|---|
| 1 | ∞ | 0.05 | | | 0.66 |
| 2 | ∞ | −0.19 | | | 0.66 |
| 3* | 1.206 | 0.68 | 1.58310 | 59.4 | 0.67 |
| 4* | 3.827 | 0.47 | | | 0.61 |
| 5* | −1.729 | 0.55 | 1.81360 | 25.7 | 0.60 |
| 6* | −1.973 | 0.68 | | | 0.68 |
| 7* | −1004.410 | 0.67 | 1.58310 | 59.4 | 0.73 |
| 8* | 2.909 | 0.16 | | | 0.82 |
| 9 | ∞ | 0.21 | 1.51630 | 64.1 | 2.50 |
| 10 | ∞ | 0.18 | | | 2.50 |
| 11 | ∞ | 0.50 | 1.47140 | 65.2 | 2.50 |
| 12 | ∞ | 0.11 | | | 2.50 |

Aspheric surface coefficient

| | |
|---|---|
| Third surface | K = 0.28959E+00 |
| | A4 = −0.17591E−01 |
| | A6 = 0.77145E−01 |
| | A8 = −0.44389E+00 |
| | A10 = 0.13796E+01 |
| | A12 = −0.22317E+01 |
| | A14 = 0.14565E+01 |
| Fourth surface | K = −0.38099E+01 |
| | A4 = 0.25962E−01 |
| | A6 = 0.25384E+00 |
| | A8 = −0.16313E+01 |
| | A10 = 0.60109E+01 |
| | A12 = −0.10689E+02 |
| | A14 = 0.71748E+01 |
| Fifth surface | K = −0.10734E+01 |
| | A4 = −0.47904E−01 |
| | A6 = −0.22624E+00 |
| | A8 = 0.16186E+01 |
| | A10 = −0.43041E+01 |
| | A12 = 0.39289E+01 |
| | A14 = 0.26505E+01 |
| | A16 = −0.66790E+01 |
| Sixth surface | K = −0.13882E+02 |
| | A4 = −0.18659E+00 |
| | A6 = 0.32159E+00 |
| | A8 = −0.22103E+00 |
| | A10 = 0.23968E+00 |
| | A12 = −0.94366E−01 |
| | A14 = −0.37659E−01 |
| | A16 = 0.31613E−01 |
| Seventh surface | K = 0.50000E+02 |
| | A4 = −0.16988E+00 |
| | A6 = 0.49367E−01 |
| | A8 = 0.11698E−01 |
| | A10 = −0.13399E−01 |
| | A12 = 0.13161E−02 |
| | A14 = 0.25370E−02 |
| | A16 = −0.71366E−03 |
| Eighth surface | K = −0.12842E+01 |
| | A4 = −0.16010E+00 |
| | A6 = 0.62002E−01 |
| | A8 = −0.23888E−01 |
| | A10 = 0.39668E−02 |

TABLE 10-continued

Example 10

A12 = 0.50295E−03
A14 = −0.33471E−03
A16 = 0.40185E−04

Single lens data

| Lens block | Forefront surface | Focal length (mm) |
|---|---|---|
| 1 | 3 | 2.755 |
| 2 | 5 | 1940.589 |
| 3 | 7 | −4.972 |

Values of the conditional expressions of respective examples are listed in Table 11.

TABLE 11

| Conditional expression | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| (1) | D4/f | 0.17 | 0.16 | 0.15 | 0.12 | 0.15 | 0.19 | 0.19 | 0.12 | 0.12 | 0.18 |
| (2) | \|f/f2\| | 0.30 | 0.003 | 0.31 | 0.53 | 0.08 | 0.002 | 0.003 | 0.34 | 0.50 | 0.002 |
| (3) | f/r3 | −1.19 | −1.64 | −2.33 | −1.41 | −0.18 | −1.72 | −1.32 | −0.02 | −0.57 | −2.16 |
| (4) | f/f3 | −0.33 | −0.53 | −0.82 | −0.28 | −0.34 | −0.52 | −0.42 | −0.18 | −0.09 | −0.75 |
| (5) | f/r4 | −0.77 | −1.49 | −1.69 | −0.70 | −0.08 | −1.59 | −1.20 | 0.39 | 0.04 | −1.89 |
| (6) | n2 | 1.81 | 1.58 | 1.81 | 1.80 | 1.81 | 1.81 | 1.81 | 1.81 | 1.81 | 1.81 |

Incidentally, each of the above examples is not designed such that an incident angle of a principal ray of the light flux that enters the image pickup plane of the solid-state image pickup element is always sufficiently small at a peripheral portion of the image pickup plane. However, in the recent technology, it has become possible to reduce shading by a revision of an arrangement of a color filter of a solid-state image pickup element and an arrangement of an onchip-microlens-array. Specifically, if a pitch of the arrangement of the color filter and the onchip-microlens-array is designed to be slightly smaller compared with a pixel pitch of the image pickup plane of the image pickup element, a light flux of oblique incidence can be guided to an light-receiving section of each pixel efficiently, because the color filter and the onchip-microlens-array are shifted greater toward an optical axis of an image pickup lens at the position which is closer to a peripheral portion of the image pickup plane. Owing to this, shading generated on solid-state image pickup element can be controlled to be small. The present examples provide design examples in which the above design requirement is lighten but further downsizing is aimed.

REFERENCE SIGNS LIST

10 Image pickup lens
20 Lower lens frame
21 Upper lens frame
50 Image pickup apparatus
51 Image sensor
51*a* Photoelectric conversion section
52 Substrate
60 Input section
70 Display section
80 Radio communication section
92 Storage section
100 Cell phone
101 Control section
CG Cover glass
L1 First lens
L2 Second lens
L3 Third lens
L1*a* to L3*a* Flange sections
PT Plate (Infrared cut-off filter)
S Aperture stop
SP Fixing member

The invention claimed is:

1. An image pickup lens comprising, in order from an object side thereof, an aperture stop, a first lens, a second lens and a third lens,
wherein the first lens is a positive lens and is a meniscus lens having a convex surface facing the object side and a concave surface facing an image side,
the second lens is a lens including a concave surface facing the object side,
the third lens is a negative lens, and
the image pickup lens satisfies the following expressions:

$$0.10 < D4/f < 0.25 \quad (1)$$

$$0.00 \leq |f/f2| < 0.65 \quad (2)$$

$$-2.50 < f/r3 < 0.00 \quad (3)$$

where D4 is a distance (mm) of an air gap on an optical axis between the second lens and the third lens,
f is a focal length (mm) of a total system of the image pickup lens,
f2 is a focal length (mm) of the second lens, and
r3 is a curvature radius (mm) of the surface facing the object side of the second lens.

2. The image pickup lens of claim 1, wherein at least a surface facing the image side of the third lens is an aspheric surface, and the aspheric surface includes at least one aspheric-surface inflection point.

3. The image pickup lens of claim 1, wherein the third lens is a negative meniscus lens in which a convex surface faces the object side in a paraxial region thereof.

4. The image pickup lens of claim 1, satisfying the following expression (4):

$$-1.00 < f3/f < 0.00 \quad (4)$$

where f3 is a focal length (mm) of the third lens.

5. The image pickup lens of claim 1, satisfying the following expression (5):

$$-1.90 < f/r4 < 0.40 \quad (5)$$

where r4 is a curvature radius (mm) of a surface facing the image side of the second lens.

6. The image pickup lens of claim 1, wherein the second lens satisfies the following expression (6):

$$1.55 < n2 \quad (6)$$

where n2 is a refractive index of the second lens.

7. The image pickup lens of claim 1, wherein each of the first lens, the second lens and the third lens is formed of a heat-resistant material.

8. An image pickup apparatus comprising the image pickup lens of claim 1 and a solid-state image pickup element.

\* \* \* \* \*